(12) United States Patent
Smith et al.

(10) Patent No.: US 12,394,404 B2
(45) Date of Patent: Aug. 19, 2025

(54) SYSTEM AND METHOD FOR NON-CONTACT MANIPULATION OF OBJECTS VIA ULTRASONIC LEVITATION

(71) Applicant: University of Washington, Seattle, WA (US)

(72) Inventors: Joshua R. Smith, Seattle, WA (US); Jared Nakahara, Seattle, WA (US); Boling Yang, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 286 days.

(21) Appl. No.: 17/798,267

(22) PCT Filed: Feb. 12, 2021

(86) PCT No.: PCT/US2021/017803
§ 371 (c)(1),
(2) Date: Aug. 8, 2022

(87) PCT Pub. No.: WO2021/163441
PCT Pub. Date: Aug. 19, 2021

(65) Prior Publication Data
US 2023/0045959 A1    Feb. 16, 2023

Related U.S. Application Data

(60) Provisional application No. 62/976,501, filed on Feb. 14, 2020.

(51) Int. Cl.
*G10K 15/00*    (2006.01)
*B25J 15/00*    (2006.01)
(Continued)

(52) U.S. Cl.
CPC ......... *G10K 15/00* (2013.01); *B25J 15/0019* (2013.01); *G10K 11/346* (2013.01); *G10K 11/352* (2013.01)

(58) Field of Classification Search
CPC ...... G10K 11/346; G10K 11/34; G10K 15/00; G10K 11/352; H04R 2217/03; H04S 7/30; B25J 15/0019
See application file for complete search history.

(56) References Cited

U.S. PATENT DOCUMENTS 870,946   A      11/1907  Fogel
4,777,823 A  *  10/1988  Barmatz ............... G10K 15/00
                                                    181/0.5
(Continued)

FOREIGN PATENT DOCUMENTS

CN  107202766       9/2017
CN  107202766  A    9/2017
(Continued)

OTHER PUBLICATIONS

Consideration of sample dimension for ultrasonic levitation (Year: 1990).*

(Continued)

*Primary Examiner* — Forrest M Phillips
*Assistant Examiner* — Joseph James Peter Illicete
(74) *Attorney, Agent, or Firm* — Christensen O'Connor Johnson Kindness PLLC

(57) ABSTRACT

System and method for non-contact manipulation of objects via ultrasonic levitation are presented herein. In one embodiment, a method for a non-contact manipulation of an object includes: generating ultrasound field by an array of ultrasound transducers; lifting the object off a dispensing device by the ultrasound field; and levitating the object by the ultrasound field.

21 Claims, 14 Drawing Sheets

(51) Int. Cl.
  G10K 11/34 (2006.01)
  G10K 11/35 (2006.01)

(56) References Cited

U.S. PATENT DOCUMENTS

| | | | |
|---|---|---|---|
| 5,203,209 A * | 4/1993 | Watkins | G01P 13/00 |
| | | | 73/570.5 |
| 6,029,518 A | 2/2000 | Oeftering | |
| 6,029,519 A * | 2/2000 | Kuklinski | G01M 10/00 |
| | | | 73/570.5 |
| 6,455,982 B1 | 9/2002 | Hashimoto | |
| 6,644,118 B2 * | 11/2003 | Kaduchak | B01D 49/006 |
| | | | 73/570.5 |
| 7,870,946 B2 | 1/2011 | Zimmermann | |
| 9,022,933 B2 * | 5/2015 | Hsieh | A61B 6/4417 |
| | | | 600/407 |
| 9,620,006 B2 * | 4/2017 | Pratt | H04L 12/2818 |
| 10,210,858 B2 * | 2/2019 | Ochiai | G10K 15/00 |
| 11,715,453 B2 * | 8/2023 | Kappus | G10K 11/22 |
| | | | 367/138 |
| 2011/0216957 A1 | 9/2011 | Hsieh | |
| 2013/0047728 A1 | 2/2013 | Cochran | |
| 2015/0230776 A1 | 8/2015 | Meier | |
| 2016/0339360 A1 | 11/2016 | Lipkens | |
| 2019/0053784 A1 | 2/2019 | Beri | |
| 2019/0108829 A1 | 4/2019 | Ochiai | |

FOREIGN PATENT DOCUMENTS

| | | |
|---|---|---|
| CN | 109669485 | 4/2019 |
| CN | 109669485 A | 4/2019 |
| CN | 109695437 | 4/2019 |
| CN | 109695437 A | 4/2019 |
| CN | 110272089 | 9/2019 |
| CN | 110272089 A | 9/2019 |
| CN | 110299317 | 10/2019 |
| CN | 110299317 A | 10/2019 |
| CN | 111013518 | 4/2020 |
| CN | 111013518 A | 4/2020 |
| CN | 111069008 | 4/2020 |
| JP | 11301832 | 11/1999 |
| JP | 3300145 | 7/2002 |
| JP | 2010052063 | 3/2010 |
| JP | 2010052063 A | 3/2010 |
| WO | 2009088307 | 7/2009 |
| WO | 2009088307 A1 | 7/2009 |
| WO | 2010131509 | 11/2010 |
| WO | 2014029505 | 2/2014 |
| WO | 2014029505 A1 | 2/2014 |

OTHER PUBLICATIONS

Matrix method for acoustic levitation simulation (Year: 2011).*
Three dimensional mid air acoustic arrays (Year: 2013).*
International Search Report and Written Opinion, International Application No. PCT/US2021/017803, Mailed Apr. 28, 2021, 10 pages.
International Preliminary Report on Patentability mailed Aug. 11, 2022, issued in the corresponding International Application No. PCT/US2021/017803, filed Feb. 12, 2021, 8 pages.
International Search Report and Written Opinion mailed Apr. 28, 2021, issued in the corresponding International Application No. PCT/US2021/017803, filed Feb. 12, 2021, 9 pages.
Aoyama, Hisayuki, et al. "Precise multiple wires driven manipulation with visual image measurement." 2014 International Conference on Manipulation, Manufacturing and Measurement on the Nanoscale (3M-NANO). IEEE, 2014.
Aronson, Reuben M., et al. "Data-driven classification of screwdriving operations." International Symposium on Experimental Robotics. Springer, Cham, 2016.
ASIMO Innovations, "Advancing Human Mobility," Honda Mobility Assistance and Robotics Technology, <https://asimo.honda.com/innovations/> [Retrieved Nov. 28, 2022], 2 pages.
Baer, Sebastian, et al. "Analysis of the particle stability in a new designed ultrasonic levitation device." Review of Scientific Instruments 82.10 (2011): 105111.
Baradarani, Aryaz, et al. "Efficient feature extraction in ultrasonic spot weld inspection." 2017 IEEE 30th Canadian Conference on Electrical and Computer Engineering (CCECE). IEEE, 2017.
R. R. Ma and A. M. Dollar, "On dexterity and dexterous manipulation," in 2011 15th International Conference on Advanced Robotics (ICAR). IEEE, 2011, pp. 1-7.
B. G. Bolling, N. Vasilakis, H. Guzman, S. G. Widen, T. G. Wood, V. L. Popov, S. Thangamani, and R. B. Tesh, "Insect-specific viruses detected in laboratory mosquito colonies and their potential implications for experiments evaluating arbovirus vector competence," The American journal of tropical medicine and hygiene, vol. 92, No. 2, pp. 422-428, 2015.
A. V. Batchelor and R. I. Wilson, "Sound localization behavior in Drosophila melanogaster depends on inter-antenna vibration amplitude comparisons," Journal of Experimental Biology, vol. 222, No. 3, p. jeb191213, 2019.
H. Gu and D. K. O'Dowd, "Whole cell recordings from brain of adult Drosophila," JoVE (Journal of Visualized Experiments), No. 6, p. e248, 2007.
J. P. Levy, R. R. Muldoon, S. Zolotukhin, and C. J. Link, "Retroviral transfer and expression of a humanized, red-shifted green fluorescent protein gene into human tumor cells," Nature biotechnology, vol. 14, No. 5, p. 610, 1996.
C. G. Stefanoff, R. Hassan, A. C. Gonzalez, L. A. B. Andrade, D. G. Tabak, S. Romano, and I. R. Zalcberg, "Laboratory strategies for efficient handling of paraffin-embedded tissues for molecular detection of clonality in non-hodgkin lymphomas," Diagnostic Molecular Pathology, vol. 12, No. 2, pp. 79-87, 2003.
F. Kong, L. Yuan, Y. F. Zheng, and W. Chen, "Automatic liquid handling for life science: a critical review of the current state of the art," Journal of laboratory automation, vol. 17, No. 3, pp. 169-185, 2012.
H. Song, D. L. Chen, and R. F. Ismagilov, "Reactions in droplets in microfluidic channels," Angewandte chemie International edition, vol. 45, No. 44, pp. 7336-7356, 2006.
C. Cork, J. O'Neill, J. Taylor, and T. Earnest, "Advanced beamline automation for biological crystallography experiments," Acta Crystallographica Section D: Biological Crystallography, vol. 62, No. 8, pp. 852-858, 2006.
B. Miles and P.L. Lee, "Achieving reproducibility and closed-loop automation in biological experimentation with an iot-enabled lab of the future," SLAS Technology: Translating Life Sciences Innovation, vol. 23, No. 5, pp. 432-439, 2018.
J. Melin and S. R. Quake, "Microfluidic large-scale integration: the evolution of design rules for biological automation," Annu. Rev. Biophys. Biomol. Struct., vol. 36, pp. 213-231, 2007.
S. K. Chollet, L. Benmayor, J.-M. Uehlinger, and J. Jacot, "Cost effective micro-system assembly automation," in 1999 7th IEEE International Conference on Emerging Technologies and Factory Automation. Proceedings ETFA'99 (Cat. No. 99TH8467), vol. 1. IEEE, 1999, pp. 359-366.
K.-F. Bohringer, K. Goldberg, M. Cohn, R. Howe, and A. Pisano, "Parallel microassembly with electrostatic force fields," in Proceedings. 1998 IEEE International Conference on Robotics and Automation (Cat. No. 98CH36146), vol. 2. IEEE, 1998, pp. 1204-1211.
D. Heriban and M. Gauthier, "Robotic micro-assembly of microparts using a piezogripper," in 2008 IEEE/RSJ International Conference on Intelligent Robots and Systems. IEEE, 2008, pp. 4042-4047.
B. Yang, P. Lancaster, and J. R. Smith, "Pre-touch sensing for sequential manipulation," in 2017 IEEE International Conference on Robotics and Automation (ICRA). IEEE, 2017, pp. 5088-5095.
L. Johannsmeier, M. Gerchow, and S. Haddadin, "A framework for robot manipulation: Skill formalism, meta learning and adaptive control," in 2019 International Conference on Robotics and Automation (ICRA). IEEE, 2019, pp. 5844-5850.
L. U. Odhner, L. P. Jentoft, M. R. Claffee, N. Corson, Y. Tenzer, R. R. Ma, M. Buehler, R. Kohout, R. D. Howe, and A. M. Dollar, "A compliant, underactuated hand for robust manipulation," The International Journal of Robotics Research, vol. 33, No. 5, pp. 736-752, 2014.

(56) References Cited

OTHER PUBLICATIONS

R. M. Aronson, A. Bhatia, Z. Jia, M. Guillame-Bert, D. Bourne, A. Dubrawski, and M. T. Mason, "Data-driven classification of screwdriving operations," in International Symposium on Experimental Robotics. Springer, 2016, pp. 244-253.
Z. Jia, A. Bhatia, R. M. Aronson, D. Bourne, and M. T. Mason, "A survey of automated threaded fastening," IEEE Transactions on Automation Science and Engineering, vol. 16, No. 1, pp. 298-310, 2018.
X. Cheng, Z. Jia, A. Bhatia, R. M. Aronson, and M. T. Mason, "Sensor selection and stage & result classifications for automated miniature screwdriving," in 2018 IEEE/RSJ International Conference on Intelligent Robots and Systems (IROS). IEEE, 2018, pp. 6078-6085.
H. M. Le, T. N. Do, and S. J. Phee, "A survey on actuators-driven surgical robots," Sensors and Actuators A: Physical, vol. 247, pp. 323-354, 2016.
M. D. Kutzer, S. M. Segreti, C. Y. Brown, M. Armand, R. H. Taylor, and S. C. Mears, "Design of a new cable-driven manipulator with a large open lumen: Preliminary applications in the minimally-invasive removal of osteolysis," in 2011 IEEE International Conference on Robotics and Automation. IEEE, 2011, pp. 2913-2920.
R. J. Murphy, Y. Otake, K. C. Wolfe, R. H. Taylor, and M. Armand, "Effects of tools inserted through snake-like surgical manipulators," in 2014 36th Annual International Conference of the IEEE Engineering in Medicine and Biology Society. IEEE, 2014, pp. 6854-6858.
P. E. Lancaster, J. R. Smith, and S. S. Srinivasa, "Improved proximity, contact, and force sensing via optimization of elastomer-air interface geometry," in 2019 International Conference on Robotics and Automation (ICRA). IEEE, 2019, pp. 3797-3803.
K. Koyama, M. Shimojo, T. Senoo, and M. Ishikawa, "High-speed high-precision proximity sensor for detection of tilt, distance, and contact," IEEE Robotics and Automation Letters, vol. 3, No. 4, pp. 3224-3231, 2018.
C. W. Lee, D.-S. Go, M. H. Heo, D.-W. Lee, and H. U. Yoon, "A soft linear actuator with gentle manipulation mechanism," in 2019 16th International Conference on Ubiquitous Robots (UR). IEEE, 2019, pp. 775-778.
A. Gupta, C. Eppner, S. Levine, and P. Abbeel, "Learning dexterous manipulation for a soft robotic hand from human demonstrations," in 2016 IEEE/RSJ International Conference on Intelligent Robots and Systems (IROS). IEEE, 2016, pp. 3786-3793.
D. Rus and M. T. Tolley, "Design, fabrication and control of soft robots," Nature, vol. 521, No. 7553, p. 467, 2015.
K. C. Galloway, K. P. Becker, B. Phillips, J. Kirby, S. Licht, D. Tchernov, R. J. Wood, and D. F. Gruber, "Soft robotic grippers for biological sampling on deep reefs," Soft robotics, vol. 3, No. 1, pp. 23-33, 2016.
F. Ilievski, A. D. Mazzeo, R. F. Shepherd, X. Chen, and G. M. Whitesides, "Soft robotics for chemists," Angewandte Chemie International Edition, vol. 50, No. 8, pp. 1890-1895, 2011.
J. Hughes, U. Culha, F. Giardina, F. Guenther, A. Rosendo, and F. Iida, "Soft manipulators and grippers: a review," Frontiers in Robotics and AI, vol. 3, p. 69, 2016.
W. Xie, C. Cao, Y. Lu, Z. Hong, and B. Wei, "Acoustic method for levitation of small living animals," Applied Physics Letters, vol. 89, No. 21, p. 214102, 2006.
T. Kozuka, K. Yasui, T. Tuziuti, A. Towata, and Y. Iida, "Noncontact acoustic manipulation in air," Japanese Journal of Applied Physics, vol. 46, No. 7S, p. 4948, 2007.
Y. Ochiai, T. Hoshi, and J. Rekimoto, "Three-dimensional mid-air acoustic manipulation by ultrasonic phased arrays," PloS one, vol. 9, No. 5, p. e97590, 2014.
O. Youssefi and E. Diller, "Contactless robotic micromanipulation in air using a magneto-acoustic system," IEEE Robotics and Automation Letters, vol. 4, No. 2, pp. 1580-1586, 2019.
A. Marzo, "Gauntlev: A wearable to manipulate free-floating objects," in Proceedings of the 2016 CHI Conference on Human Factors in Computing Systems. ACM, 2016, pp. 3277-3281.
H. Bruus, "Acoustofluidics 7: The acoustic radiation force on small particles," Lab on a Chip, vol. 12, No. 6, pp. 1014-1021, 2012.
G. Gaunaurd and H. H, "Acoustic scattering by a spherical body near a plane boundary," J. Acoust. Soc. Am., vol. 96, pp. 2526-2536, 1994.
S. A. Seah, B. W. Drinkwater, T. Carter, R. Malkin, and S. Subramanian, "Correspondence: Dexterous ultrasonic levitation of millimetersized objects in air," IEEE transactions on ultrasonics, ferroelectrics, and frequency control, vol. 61, No. 7, pp. 1233-1236, 2014.
C. R. Courtney, B. W. Drinkwater, C. E. Demore, S. Cochran, A. Grinenko, and P. D. Wilcox, "Dexterous manipulation of microparticles using bessel-function acoustic pressure fields," Applied Physics Letters, vol. 102, No. 12, p. 123508, 2013.
A. Marzo, S. A. Seah, B. W. Drinkwater, D. R. Sahoo, B. Long, and S. Subramanian, "Holographic acoustic elements for manipulation of levitated objects," Nature communications, vol. 6, p. 8661, 2015.
Y. Yang, S. Shen, K. Lui, K. Lee, J. Chen, H. Ding, L. Liu, H. Lu, L. Duan, C. Wang, Y. Shen, "Ultrasonic Robotic System for Noncontact Small Object Manipulation Based on Kinect Gesture Control," International Journal of Advanced Robotic Systems, vol. 14, No. 6, pp. 1-7, 2017.
R. Gabai, R. Shaham, S. Davis, N. Cohen, I. Bucher, "A Contactless Stage Based on Near-Field Acoustic Levitation for Object Handling and Positioning-Concept, Design, Modeling, and Experiments," IEEE/ASME Transactions on Mechatronics, vol. 24, No. 5, pp. 1954-1963, 2019.
S.A. Seah, B.W. Drinkwater, T. Carter, R. Malkin, S. Subramanian, "Correspondence: Dexterous Ultrasonic Levitation of Millimeter-Sized Objects in Air," IEEE Transactions on Ultrasonics, Ferroelectrics, and Frequency Control, vol. 61, No. 7, 2014.
K. Feng, Y. Liu, M. Cheng, "Numerical analysis of the transportation characteristics of a self-running sliding stage based on near-field acoustic levitation," The Journal of the Acoustical Society of America, vol. 138, No. 6, 2015.
W. Shang, Y. Yang, H. Lu, Y. Shen, "Remote Control Non-contact Manipulation System for Micro Robotics," IEEE Conference Publication, 2017.
J. Nakahara, B. Yang, J. R. Smith, "Contact-less Manipulation of Millimeter-scale Objects via Ultrasonic Levitation," Dept. of Electrical and Computer Engineering and Paul G. Allen School of Computer Science and Engineering, 2020.
A. Grineko, P. D. Wilcox, C. R.P. Courtney, B. W. Drinkwater, "Proof, of principle studu of ultrasonic particle manipulation by a circular array device," Department of Mechanical Engineering, University of Bristol, Bristol BS8 1TR, UK, 2012.
C. Zhou, Q. Wang, S. Pu, "Focused acoustic vortex generated by a circular array of planar sector transducers using an acoustic lens, and its application in object manipulation," Journal of Applied Physics, vol. 128, No. 8, 2020.
T. Ide, J. Friend, K. Nakamura, S. Ueha, "A non-contact linear bearing and actuator via ultrasonic levitation," ScienceDirect, 2007.
L. Feng, P. Di, F. Arai, "High-precision motion of magnetic microrobot with ultrasonic levitation for 3-D rotation of single pocyte," The International Journal of Robotics Research, vol. 35, No. 12, pp. 1445-1458, 2016.
BCC Publishing Staff, "Robotics: Technologies and Global Markets," BBC Publishing, 2022.
W. Garage, "PR2," IEEE, Robots, 2010. https://robots.IEEE.org/robots/pr2/ [retrieved Jan. 24, 2023].
"The Everyday Robot Project", Google X. https://x.company/projects/everyday-robots/ [retrieved Jan. 24, 2023].
E. Guizzo, "Types of Robots," IEEE, 2018. https://robots.ieee.org/learn/types-of-robots/ [retrieved Jan. 24, 2023].
E. Guizzo, "What is a Robot?," IEEE, 2018 https://robots.ieee.org/learn/what-is-a-robot/ [retrieved Jan. 24, 2023].
Nakahara, J. and J. R. Smith, "Acoustic Balance: Weighing in Ultrasonic Non-Contact Manipulators," IEEE Robotics and Automation Letters, vol. 7, No. 4, Oct. 2022, pp. 9145-9150.
Marzo, A. et al., "Holographic acoustic elements for manipulation of levitated objects," Nature Communications, 6:861; pp. 1-7.

(56) References Cited

OTHER PUBLICATIONS

Santesson, S. and S. Nilsson, "Airborne chemistry: acoustic levitation in chemical analysis," Anal Bioanal Chem (2004) 378 : 1704-1709. DOI 10.1007/s00216-003-2403-2.

Lim, M. X. et al., "Cluster formation by acoustic forces and active fluctuations in levitated granular matter," Nature Physics, vol. 15, No. 5, pp. 460-464. https://doi.org/10.1038/s41567-019-0440-9 and available online via: https://www.nature.com/articles/s41567-019-0440-9.

Xie, W. J. et al., "Acoustic method for levitation of small living animals," Appl. Phys. Lett. 89, 214102 (2006) https://doi.org/10.1063/1.2396893.

Jeger-Madiot, N. et al., "Self-organization and culture of Mesenchymal Stem Cell spheroids in acoustic levitation," Scientific Reports (2021) 11:8355. https://doi.org/10.1038/s41598-021-87459-6.

Rothlisberger, M. et al., "Automated Insertion of Objects Into an Acoustic Robotic Gripper," Proceedings 2020, 64, 40; doi:10.3390/IeCAT2020-08510.

Morales, R. et al., "Generating Airborne Ultrasonic Amplitude Patterns Using an Open Hardware Phased Array," Appl. Sci. 2021, 11, 2981. https://doi.org/10.3390/app11072981.

Dohn, S. et al., "Cantilever based mass sensor with hard contact readout," Appl. Phys. Lett. 88, 264104 (2006). https://doi.org/10.1063/1.2217161.

Burg, T. P. et al., "Vacuum-Packaged Suspended Microchannel Resonant Mass Sensor for Biomolecular Detection," Journal of Microelectromechanical Systems vol. 15, No. 6, pp. 1-10, 2006.

Bryan, A. K. et al., "Measuring single cell mass, volume, and density with dual suspended microchannel resonators," Lab Chip, 2014, 14, 569.

Trinh, E. H. and K. Ohsaka, "Measurement of Density, Sound Velocity, Surface Tension, and Viscosity of Freely Suspended Supercooled Liquids," International Journal of Thermophysics, vol. 16. No. 2. 1995.

Hillberry, L. E. et al., "Weighing an Optically Trapped Microsphere in Thermal Equilibrium With Air," Physical Review Applied 14, 044027 (2020); pp. 044027-1 through 044027-10.

Dutta, S. and S. Bordoloi, "Measurement of weight using magnetic levitation," Proceedings of International Conference on Circuits, Communication, Control and Computing (14C 2014); MSRIT, Bangalore, India, Nov. 21-22, 2014, pp. 45-49.

Ellson, R. et al., "Transfer of Low Nanoliter Volumes between Microplates Using Focused Acoustics—Automation Considerations," JALA Oct. 2003, pp. 29-34.

Bruus, H., "Acoustofluidics 7: The acoustic radiation force on small particles," Cite this: Lab Chip, 2012, 12, 1014.

Wong, G. S. and T. F. W. Embleton, "Variation of the speed of sound in air with humidity and temperature," J. Acoust. Soc. Am. 77, 1710-1712 (1985). https://doi.org/10.1121/1.391918.

Bjelobrk, N. et al., "Acoustic levitator for contactless motion and merging of large droplets in air," J. Appl. Phys. 112, 053510 (2012). https://doi.org/10.1063/1.4749420.

Andrade, M. B. et al., "Review of Progress in Acoustic Levitation," Brazilian Journal of Physics (2018) 48:190-213. https://doi.org/10.1007/s13538-017-0552-6.

Ochiai, Y. et al., "Pixie Dust: Graphics Generated by Levitated and Animated Objects in Computational Acoustic-Potential Field," ACM Trans. Graph. 33, 4, Article 85 (Jul. 2014), 13 pages. DOI = 10.1145/2601097.2601118 http://doi.acm.org/10.1145/2601097.2601118.

Hoshi, T. et al., "Three-dimensional noncontact manipulation by opposite ultrasonic phased arrays," 2014 Jpn. J. Appl. Phys. 53 07KE07.

Morrell, M. and D. G. Grier, "Acoustodynamic mass determination: Accounting for inertial effects in acoustic levitation of granular materials," Physical Review E 108, 064903 (2023), pp. 064903-1 through 064903-6.

Ma, R. R. and A. M. Dollar, "On Dexterity and Dexterous Manipulation," The 15th International Conference on Advanced Robotics Tallinn University of Technology Tallinn, Estonia, Jun. 20-23, 2011, pp. 1-7.

Bolling, B. G. et al, "Insect-Specific Viruses Detected in Laboratory Mosquito Colonies and Their Potential Implications for Experiments Evaluating Arbovirus Vector Competence," Am. J. Trop. Med. Hyg., 92(2), 2015, pp. 422-428. doi:10.4269/ajtmh.14-0330.

Batchelor, A. V. and R. I. Wilson, "Sound localization behavior in *Drosophila melanogaster* depends on inter-antenna vibration amplitude comparisons," Journal of Experimental Biology (2019) 222, jeb191213. doi:10.1242/jeb.191213.

Gu, H. and D. K. ODowd, "Whole Cell Recordings from Brain of Adult *Drosophila*," JoVE. 6. http://www.jove.com/index/Details.stp?ID=248, doi: 10.3791/248.

Levy, J. P. et al., "Retro viral transfer and expression of a hun1anized, red-shifted green fluorescent protein gene into hun1an tun1or cells," Nature Biotechnology vol. 14 May 1996, pp. 610-614.

Stefanoff, M.Sc. C. G. et al., "Laboratory Strategies for Efficient Handling of Paraffin-Embedded Tissues for Molecular Detection of Clonality in Non-Hodgkin Lymphomas," Diagnostic Molecular Pathology 12(2): 79-87, 2003.

Kong, F. et al., "Automatic Liquid Handling for Life Science: A Critical Review of the Current State of the Art," Journal of Laboratory Automation 17(3) 169-185.

Song, H. et al., "Reactions in Droplets in Microfluidic Channels," Angew. Chem. Int. Ed. 2006, 45, 7336-7356.

Cork, C. et al., "Advanced beamline automation for biologicalcrystallography experiments," research papers vol. 62, Part 8, Aug. 2006, pp. 852-858.

Miles, B. and P. L. Lee, "Achieving Reproducibility and Closed-Loop Automation in Biological Experimentation with an IoT-Enabled Lab of the Future," SLAS Technology 2018, vol. 23(5) 432-439.

Melin, J. and S. R. Quake, "Microfluidic Large-Scale Integration: The Evolution of Design Rules for Biological Automation," Annu. Rev. Biophys. Biomol. Struct. 2007. 36:213-31.

Chollet, K. et al., "Cost Effective Micro-System Assembly Automation," in 1999 7th IEEE International Conference on Emerging Technologies and Factory Automation. Proceedings ETFA99 (Cat. No. 99TH8467), vol. 1. IEEE, 1999, pp. 359-366.

Bohringer, K.-F. et al., "Parallel Microassembly with Electrostatic Force Fields," Proceedings ofthe 1998 IEEE International Conference on Robotics & Automation Leuven, Belgium May 1998; pp. -1204-1211.

Heriban, D. and M. Gauthier, "Robotic Micro-assembly of Microparts Using a Piezogripper," 2008 IEEE/RSJ International Conference on Intelligent Robots and Systems Acropolis Convention Center Nice, France, Sep. 22-26, 2008, pp. 4042-4047.

Yang, B. et al., "Pre-touch Sensing for Sequential Manipulation," in 2017 IEEE International Conference on Robotics and Automation (ICRA). IEEE, 2017, pp. 5088-5095.

Johannsmeier, L. et al., "A Framework for Robot Manipulation: Skill Formalism, Meta Learning and Adaptive Control," in 2019 International Conference on Robotics and Automation (ICRA). IEEE, 2019, pp. 5844-5850.

Odhner, L. U. et al., "A Compliant, Underactuated Hand for Robust Manipulation," The International Journal of Robotics Research, vol. 33, No. 5, pp. 736-752, 2014.

Aronson, R. M. et al., "Data-driven Classication of Screwdriving Operations," in International Symposium on Experimental Robotics. Springer, 2016, pp. 244-253.

Jia, Z. et al., "A Survey of Automated Threaded Fastening," IEEE Transactions on Automation Science and Engineering, vol. 16, No. 1, Jan. 2019, pp. 298-310.

Cheng, X. et al., "Sensor Selection and Stage & Result Classifications for Automated Miniature Screwdriving," 2018 IEEE/RSJ International Conference on Intelligent Robots and Systems (IROS) Madrid, Spain, Oct. 1-5, 2018, pp. 6078-6085.

Le, H. M. et al., "A survey on actuators—driven surgical robots," Elsevier: Sensors and Actuators A 247 (2016) 323-354.

Kutzer, M. D. M. et al., "Design of a New Cable-Driven Manipulator with a Large Open Lumen: Preliminary Applications in the

(56) References Cited

OTHER PUBLICATIONS

Minimally-Invasive Removal of Osteolysis," 2011 IEEE International Conference on Robotics and Automation Shanghai International Conference Center May 9-13, 2011, Shanghai, China, pp. 2913-2920.
Murphy, R. J. et al., "Effects of Tools Inserted through Snake-like Surgical Manipulators," Conf Proc IEEE Eng Med Biol Soc. 2014 ; 2014: 6854-6858. doi:10.1109/EMBC.2014.6945203.
Aoyama, H. et al., "Precise Multiple Wires Driven Manipulation with Visual Image Measurement," 2014 International Conference on Manipulation, Manufacturing and Measurement on the Nanoscale (3M-NANO) Oct. 27-31, 2014, Taipei, pp. 70-73.
Lancaster, P. E. et al., "Improved Proximity, Contact, and Force Sensing via Optimization of Elastomer-Air Interface Geometry," 2019 International Conference on Robotics and Automation (ICRA) Palais des congres de Montreal, Montreal, Canada, May 20-24, 2019, pp. 3797-3803.
Koyama, K. et al., "High-Speed High-Precision Proximity Sensor for Detection of Tilt, Distance, and Contact," IEEE Robotics and Automation Letters, vol. 3, No. 4, Oct. 2018, pp. 3224-3231.
Lee, C. W. et al., "A Soft Linear Actuator with Gentle Manipulation Mechanism," 2019 16th International Conference on Ubiquitous Robots (UR) Jeju, Korea, Jun. 24-27, 2019, pp. 775-778.
Gupta, A. et al., "Learning Dexterous Manipulation for a Soft Robotic Hand from Human Demonstrations," in 2016 IEEE/RSJ International Conference on Intelligent Robots and Systems (IROS). IEEE, 2016, pp. 3786-3793.
Rus, D. and M. T. Tolley, "Design, fabrication and control of soft robots," Nature vol. 521, May 28, 2015, pp. 467-475.
Galloway, K. C. et al., "Soft Robotic Grippers for Biological Sampling on Deep Reefs," Soft Robotics vol. 3, No. 1, 2016 Mary Ann Liebert, Inc. DOI: 10.1089/soro.2015.0019.
Illievski, F. et al., :Soft Robotics for Chemists, Angew. Chem. Int. Ed. 2011, 50, 1890-1895.
Hughes, J. et al., "Soft Manipulators and Grippers: A Review," Frontiers in Robotics and AI vol. 3, Article 69, Nov. 2016, pp. 1-12.
Kozuka, T. et al., "Noncontact Acoustic Manipulation in Air," 2007 Jpn. J. Appl. Phys. 46 4948.
Ochiai, Y. et al., "Three-Dimensional Mid-Air Acoustic Manipulation by Ultrasonic Phased Arrays," PLoS One 9(5): e97590. doi: 10.1371/journal.pone.0097590.
Youssefi, O. et al., "Contactless Robotic Micromanipulation in Air Using a Magneto-Acoustic System," IEEE Robotics and Automation Letters, vol. 4, No. 2, Apr. 2019, pp. 1580-1586.
Marzo, A., "GauntLev: A Wearable to Manipulate Free-floating Objects," in Proceedings of the 2016 CHI Conference on Human Factors in Computing Systems. ACM, 2016, pp. 3277-3281.
Gaunaurd, G. C. and H. Huang, "Acoustic scattering by a spherical body near a plane boundary," J. Acoust. Soc. Am. 96, 2526-2536 (1994). https://doi.org/10.1121/1.410126.
Seah, S. A. et al., "Dexterous Ultrasonic Levitation of Millimeter-Sized Objects in Air," IEEE Transactions on Ultrasonics, Ferroelectrics, and Frequency Control, vol. 61, No. 7, Jul. 2014, pp. 1233-1236.
Courtney, CRP, Drinkwater, BW, Grinenko, A, Wilcox, PD, Demore, CEM & Cochran, S 2013, Dexterous manipulation of microparticles using Bessel-function acoustic pressure fields, Applied Physics Letters, vol. 102, No. 12, 123508. https://doi.org/10.1063/1.4798584.
Integrated Force Control Robotics—Equipment and Ecosystem/ Equipment and Ecosystem/ ABB, "Adaptice motion technology." Accessed Mar. 3, 2025. <https://new.abb.com/products/robotics/equipment-ecosystem/integrated-force-control>.
Atlas/Boston Dynamics, Accessed Mar. 3, 2025. <https://www.bostondynamics.com/atlas>.
What we learned from ASIMO / Honda Robotics / Honda Global. Accessed Mar. 3, 2025. <https://asimo.honda.com/innovations/>.
Da Vinci Surgical Instruments / Intuitive. Accessed Mar. 3, 2025. <https://www.intuitive.com/en-us/products-and-services/da-vinci/instruments>.
Yang, Y. et al., "Ultrasonic robotic system for noncontact small object manipulation based on Kinect gesture control," International Journal of Advanced Robotic Systems Nov.-Dec. 2017: 1-7.
Gabai, R. et al., "A Contactless Stage Based on Near-Field Acoustic Levitation for Object Handling and Positioning—Concept, Design, Modeling, and Experiments," IEEE/ASME Transactions on Mechatronics, vol. 24, No. 5, Oct. 2019, pp. 1954-1963.
IEEE. "What is a Robot?" <https://robots.ieee.org/learn/>.
IEEE. "Types of Robots." <https://robots.ieee.org/learn/types-of-robots/>.
Google X. "The Everyday Robot Project." https://x.company/projects/everyday-robots.
IEEE. "PR2"—Robots: Your Guide to the World of Robotics. Accessed Mar. 3, 2025 <https://robots.ieee.org/robots/pr2/>.
BCC Research. "Robotics: Technologies and Global Markets." pp. 1-9. <https://www.bccresearch.com/market-research/engineering/robotics.html>.
Baer, S. et al., "Analysis of the particle stability in a new designed ultrasonic levitation device," Rev. Sci. Instrum. 82, 105111 (2011). https://doi.org/10.1063/1.3652976.
Feng, L. et al., "High-precision motion of magnetic microrobot with ultrasonic levitation for 3-D rotation of single oocyte," The International Journal of Robotics Research 2016, vol. 35(12) 1445-1458.
Ide, T. et al., "A non-contact linear bearing and actuator via ultrasonic levitation," Elsevier: Sensors and Actuators A 135 (2007) 740-747.
Zhou, C. et al., "Focused acoustic vortex generated by a circular array of planar sector transducers using an acoustic lens, and its application in object manipulation," J. Appl. Phys. 128, 084901 (2020). https://doi.org/10.1063/5.0006703.
Grinenko, A. et al., "Proof of principle study of ultrasonic particle manipulation by a circular array device," Proc. R. Soc. A (2012) 468, 3571-3586. doi:10.1098/rspa.2012.0232.
Shang, W. et al., "Remote Control Non-contact Manipulation System for Micro Robotics," 2017 IEEE International Conference on Cyborg and Bionic Systems Oct. 17-19, 2017, Beijing, China, pp. 178-182.
Feng, K. et al., "Numerical analysis of the transportation characteristics of a self-running sliding stage based on near-field acoustic levitation," J. Acoust. Soc. Am. 138, 3723-3732 (2015). https://doi.org/10.1121/1.4938220.
Baradarani, A. et al., "Efficient Feature Extraction in Ultrasonic Spot Weld Inspection," 2017 IEEE 30th Canadian Conference on Electrical and Computer Engineering (CCECE), 4 pages.
Andrade, M. A. et al., "Matrix Method for Acoustic Levitation Simulation," IEEE Transactions on Ultrasonics, Ferroelectrics, and Frequency Control, Vo. 58, No. 8, Aug. 2011, pp. 1674-1683.
Otsuka, T. et al., Consideration of Sample Dimention for Ultrasonic Levitation,; 1990 Ultrasonics Symposium; IEEE; pp. 1271-1274.
Ochiai, Y. et al., "Three-dimensiona Mid-air Acoustic Manipulation by Ultrasonic Phased Arrays," The University of Tokyo, Graduate School of Interdisciplinary Information Studies (2013), 5 pages.
Andrade, M. A. B. et al., "Automatic contactless injection, transportation, merging, and ejection of droplets with a multifocal point acoustic levitator," Rev. Sci. Instrum. 89, 125105 (2018). https://doi.org/10.1063/1.5063715.
Learn About Robotics—Robots: Your Guide to the World of Robotics. Accessed Mar. 3, 2025. <https://robotsguide.com/learn/>.
Guizzo, E. Types of Robots—Robots: Your Guide to the World of Robotics (2018). Accessed Mar. 3, 2025. <https://robotsguide.com/learn/types-of-robots/>.
"Taking Weighing to New Limits," XPR Microbalances datasheet, Mettler Toledo, Apr. 2022.
Nakahara, J. et al., "Contact-less Manipulation of Millimeter-scale Objects via Ultrasonic Levitation," 2020 8th IEEE RAS/EMBS International Conference for Biomedical Robotics and Biomechatronics (BioRob), pp. 264-271, 2020.
S. L. Vieira and M. A. B. Andrade, "Translational and rotational resonance frequencies of a disk in a single-axis acoustic levitator," Journal of Applied Physics, vol. 127, No. 224901, 2020.

* cited by examiner

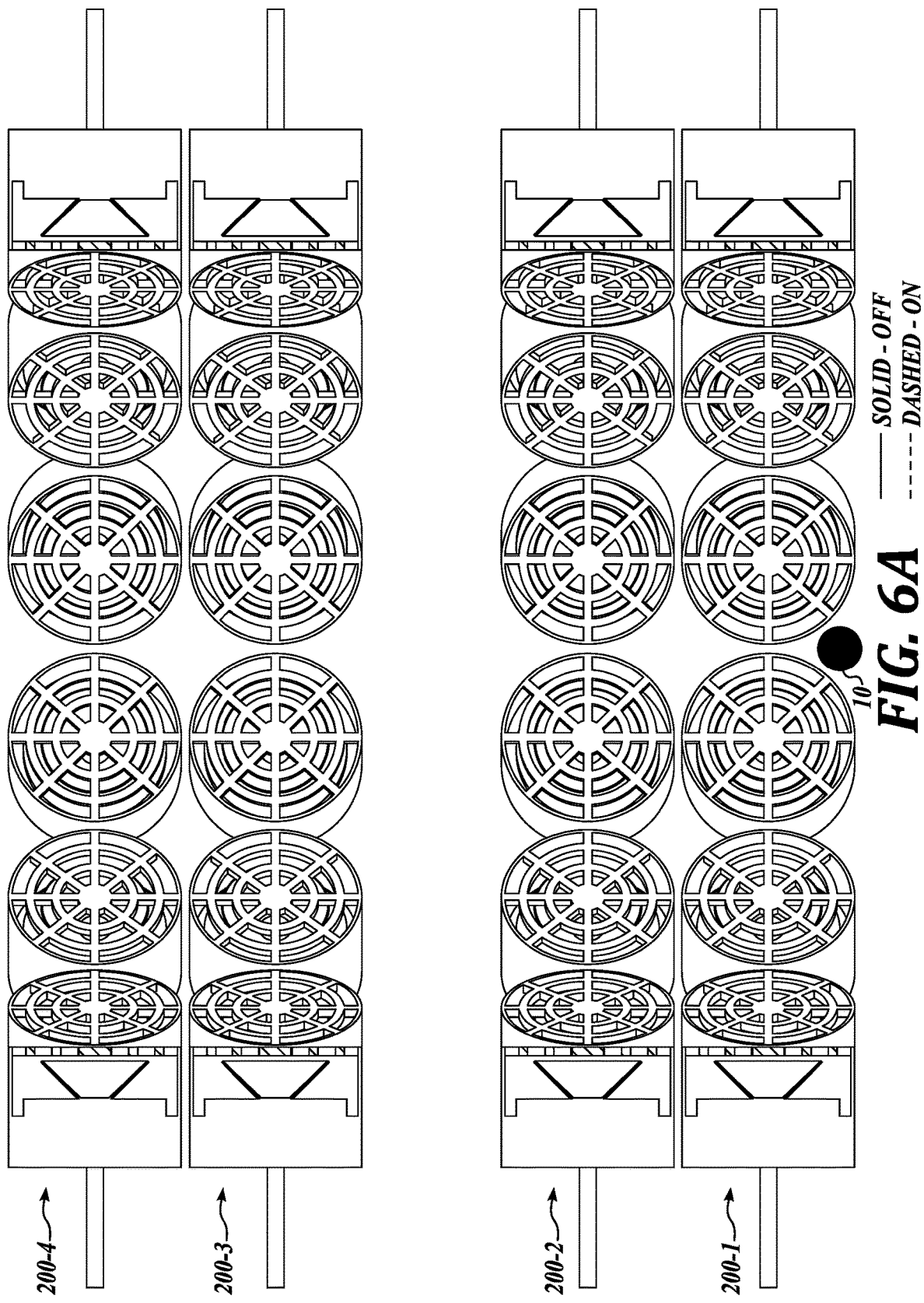

SYSTEM AND METHOD FOR NON-CONTACT MANIPULATION OF OBJECTS VIA ULTRASONIC LEVITATION

CROSS-REFERENCE TO RELATED APPLICATIONS

This application is a National Stage of International Application No. PCT/2021/017803, filed Feb. 12, 2021, which claims the benefit of U.S. Provisional Application No. 62/976,501, filed Feb. 14, 2020, now expired, the disclosures of which are expressly incorporated herein by reference in their entirety.

STATEMENT OF GOVERNMENT LICENSE RIGHTS

This invention was made with government support under Grant No. EFMA-1832795, awarded by the National Science Foundation. The government has certain rights in the invention.

BACKGROUND

Robots have become increasingly capable of dexterous manipulation, typically achieved by arm and manipulator designs with high number of degrees of freedom, accurate object pose estimation, sophisticated motion planning and motor skills. However, most general-purpose robots' dexterities are limited to manipulating larger objects on the scale of centimeters or above, lacking the ability to perform the same level of manipulation on smaller objects. With limited gripping force resolution and positioning accuracy, these robots can miss or damage the target object in cases when the object of interest is small or fragile.

However, millimeter-scale manipulation is a skill required for daily life, scientific research, and manufacturing industry. For example, in biology, neural science, and other related research areas, experiments that involve handling small, deformable and fragile objects like insects, biological tissues, and drops of fluid are common. Similarly, objects like bare silicon dyes and electronic components used in micro assembly and PCB manufacturing industries also need an extra level of caution and precision because of their size and fragility. Accordingly, the need still remains for systems and methods for manipulating millimeter-scale objects.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Briefly, the inventive technology uses acoustic levitators and acoustic traps to manipulate millimeter-scale objects through the processes of localized pressure modulation via high frequency acoustic wave interference. By taking advantage of the non-linearity of sound in air, sound (e.g., ultrasound) can be used to generate lift on an object within the acoustic field, allowing it to overcome gravitational forces. Inventive levitation device can manipulate objects that are placed within an area called the basin of attraction, where a relatively large manipulation area adds extra robustness to compensate for robot positioning uncertainty.

In some embodiments, an array of ultrasound transducers may be arranged in a circular or a rectangular arrangement. The input signal is sent with appropriate phase delays to the individual ultrasound transducers, where the resulting ultrasound field includes extrema (e.g., pressure minima) that can capture small objects, for example, droplets of fluid, particles of powder materials, insects, integrated circuit chips, flowers, or other fragile or small objects (e.g., small, millimeter-scale objects). These objects can be picked off of an acoustically reflective surface, such as a table top or other surface capable of carrying small objects.

Additionally, an acoustic field modeling method may be used for improving the simulated force dynamics inside the levitator. The modeling method improves the dexterity of acoustic manipulator by enabling acoustic manipulation, including picking object from a flat surface without the need for object support structures or for dispensing of the object.

Phase delays for the acoustic transducers may be generated by a combination of a processor and a programmable logic (e.g., FPGA). In different embodiments, multiple arrays of ultrasound transducers may be vertically stacked and operated synchronously to improve handling of the objects. In some embodiments, the array of ultrasound transducers may be handled by a robotic arm to increase operational range of the ultrasound field.

In one embodiment, a method for a non-contact manipulation of an object includes: generating ultrasound field by an array of ultrasound transducers, lifting the object off a dispensing device by the ultrasound field; and levitating the object by the ultrasound field. In another embodiment, the method also includes: generating phase delay inputs by a processor; receiving the phase delay inputs by a programmable logic device; producing phase delay signals by the programmable logic device; receiving the phase delay signals the ultrasound transducers; and activating individual ultrasound transducers based on the phase delay signals.

In one embodiment, the array of ultrasound transducers is a first array of ultrasound transducers, the method also includes generating the ultrasound field by a second array of ultrasound transducers. The first array of ultrasound transducers and the second array of ultrasound transducers are vertically stacked.

In another embodiment, the method also includes: selectively deactivating ultrasound transducers of the first array of ultrasound transducers and the second array of ultrasound transducers.

In one embodiment, the method includes selectively deactivating the first array of ultrasound transducers or the second array of ultrasound transducers. In another embodiment, the method also includes generating the ultrasound field by a third array of ultrasound transducers; and generating the ultrasound field by a fourth array of ultrasound transducers. The first, second, third and fourth arrays of ultrasound transducers are vertically stacked. In one embodiment, the ultrasound transducers of the first, second, third and fourth arrays of ultrasound transducers are circularly arranged within their respective arrays. In another embodiment, the ultrasound transducers of the first, second, third and fourth arrays of ultrasound transducers are rectangularly arranged within their respective arrays.

In one embodiment, the method includes changing a position of the array of ultrasound transducers by a mechanical manipulator. In another embodiment, the mechanical manipulator is a robotic arm attached to the array of ultrasound transducers.

In one embodiment, the object is a fluid particle, a particle of powder material, an insect, an integrated circuit chip, or a flower. In another embodiment, the method further includes: lifting a second object off the dispensing device by the ultrasound field; levitating the second object by the ultrasound field; and bringing the second object in contact with the first object.

In one embodiment, a device for non-contact manipulation of an object includes: an array of ultrasound transducers configured for generating an ultrasound field; and a controller configured to generate phase delay signals for the array of ultrasound transducers. The ultrasound field is configured for: lifting the object off a dispensing device by the ultrasound field, and levitating the object by the ultrasound field. In one embodiment, the controller includes: a processor configured for generating phase delay inputs; and a programmable logic device configured for receiving the phase delay inputs from the processor and for producing the phase delay signals.

In one embodiment, the device also includes a mechanical manipulator that is attached to the array of ultrasound transducers. The mechanical manipulator is configured for changing a position of the array of ultrasound transducers. In another embodiment, the mechanical manipulator is a robotic arm. In one embodiment, the object is a fluid particle, a particle of powder material, an insect, an integrated circuit chip, or a flower.

In one embodiment, the array of ultrasound transducers is a first array of ultrasound transducers. The device also includes, second array of ultrasound transducers configured for generating the ultrasound field. The first array of ultrasound transducers and the second array of ultrasound transducers are vertically stacked. In another embodiment, the device includes a third array of ultrasound transducers configured for generating the ultrasound field; and a fourth array of ultrasound transducers configured for generating the ultrasound field. The first, second, third and fourth arrays of ultrasound transducers are vertically stacked.

In one embodiment, the individual ultrasound transducers of the first, second, third and fourth arrays of ultrasound transducers are configured for: individual activation and deactivation, or array-by-array activation and deactivation.

In one embodiment, the ultrasound transducers are circularly or rectangularly arranged within their respective arrays.

DESCRIPTION OF THE DRAWINGS

The foregoing aspects and many of the attendant advantages of this inventive technology will become more readily appreciated as the same become better understood by reference to the following detailed description, when taken in conjunction with the accompanying drawings, wherein:

FIGS. 6A-6F are partially schematic diagrams of activating and deactivating individual transducers in accordance with an embodiment of the present technology;

DETAILED DESCRIPTION

Example devices, methods, and systems are described herein. It should be understood the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood aspects of the present disclosure, as generally described herein, and illustrated in the figures, can be arranged, substituted, combined, separated, and designed in a wide variety of different configurations, all of which are explicitly contemplated herein.

Figure 1:
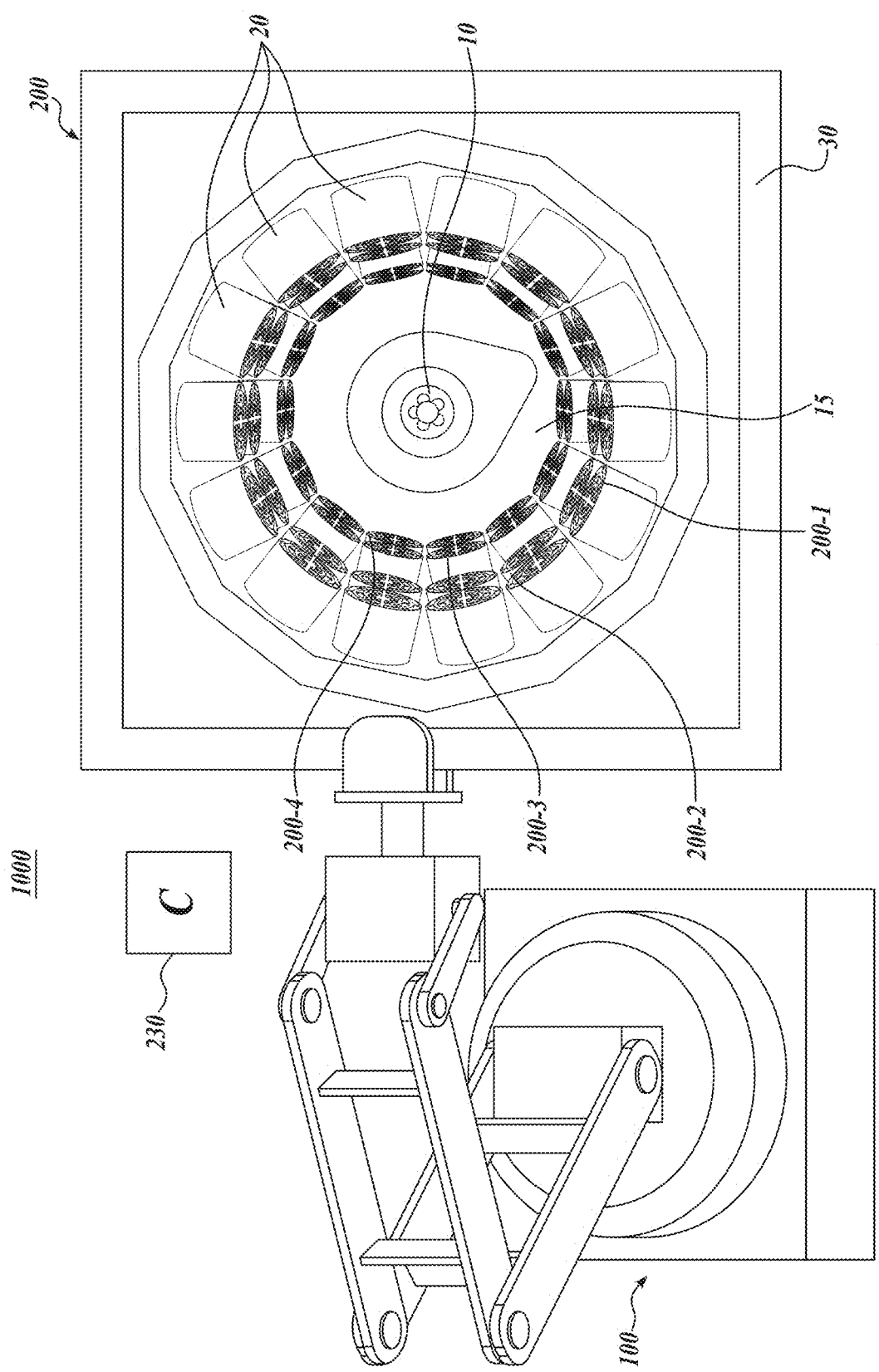
FIG. 1 is an isometric drawing of a system for non-contact manipulation of objects via ultrasonic levitation in accordance with an embodiment of the present technology.

FIG. 1 is an isometric drawing of a system 1000 for non-contact manipulation of objects via ultrasonic levitation in accordance with an embodiment of the present technology. The illustrated system (also referred-to to as an manipulator assembly) 1000 includes an ultrasound levitator (also referred to as an ultrasound manipulator or acoustic manipulator) 200 having four ultrasound arrays: 200-1, 200-2, 200-3 and 200-4, each of which may include multiple ultrasound transducers 20. In different embodiments, the ultrasound transducers of ultrasound array may be arranged in a circular arrangement (as illustrated), a rectangular arrangement, or other arrangements. The ultrasound arrays **200-*i* may be held together by a frame 30**.

In operation, the ultrasound transducers 20 emit ultrasound toward a target 10. In some embodiments, the target 10 may be carried by a dispensing device 15. In the illustrated embodiment, the dispensing device is a stage or table 15. However, in other embodiments the dispensing device 15 may include other solid surfaces (e.g., a moving belt), tweezers, syringes, other tools used to dispense objects, aerosols generators, etc. In different embodiments, the acoustic levitator 200 can pick up and inspect small and fragile objects 10 like insects, integrated circuit chips, flowers, living cells, fluid particles, solid particles, or other millimeter scale objects without damaging them. As further explained below, the manipulator assembly 1000 may be capable of picking the target 10 directly off the solid surface of the table 15.

In some embodiments, manipulator assembly 1000 includes a mechanical manipulator 100. Some nonlimiting examples of the mechanical manipulator are a robotic arm or a movable stage. The mechanical manipulator 100 may assist in picking up an object, extracting visual features from the object, and performing object sorting based on the extracted features. In many embodiments, the system 1000 may provide an unblocked view of the entire object 10.

In some embodiments, operation of the acoustic manipulator 200 may be based on an acoustic field modeling that optimizes the simulated force dynamics inside the acoustic levitator 200. A sample modeling method explained below may improve the dexterity of the acoustic manipulator 200 by enabling acoustic manipulation, including picking object from a flat surface without the need for object support structures or having to dispense the object. In some embodiments, the ultrasound transducers 20 are subject to phase delays that can be expressed by equation 1 below as follows:

$$\varphi = \frac{\text{round}\left(128\sqrt{(X-x)^2 + (Y-y)^2 + (Z-z)^2} \, \% \lambda\right)}{\lambda} \quad (1)$$

where $\varphi$ is an 8-bit integer phase value from 0 to 127, representing discretization of continuous phase of a single transducer, X is a target X position, Y is a target Y position, Z is a target Z position, x is acoustic source x position, y is acoustic source y position, z is acoustic source z position, k is a wavelength, % is a modulus operator, and round is a mathematical operator.

In different embodiments, the controller 230 may control the application of the Eq. 1 at individual ultrasound transducers 20. The controller may include suitable software and electronic components, for example, one or more processors and programmable arrays, as further described below with respect to FIG. 7.

Figure 2:
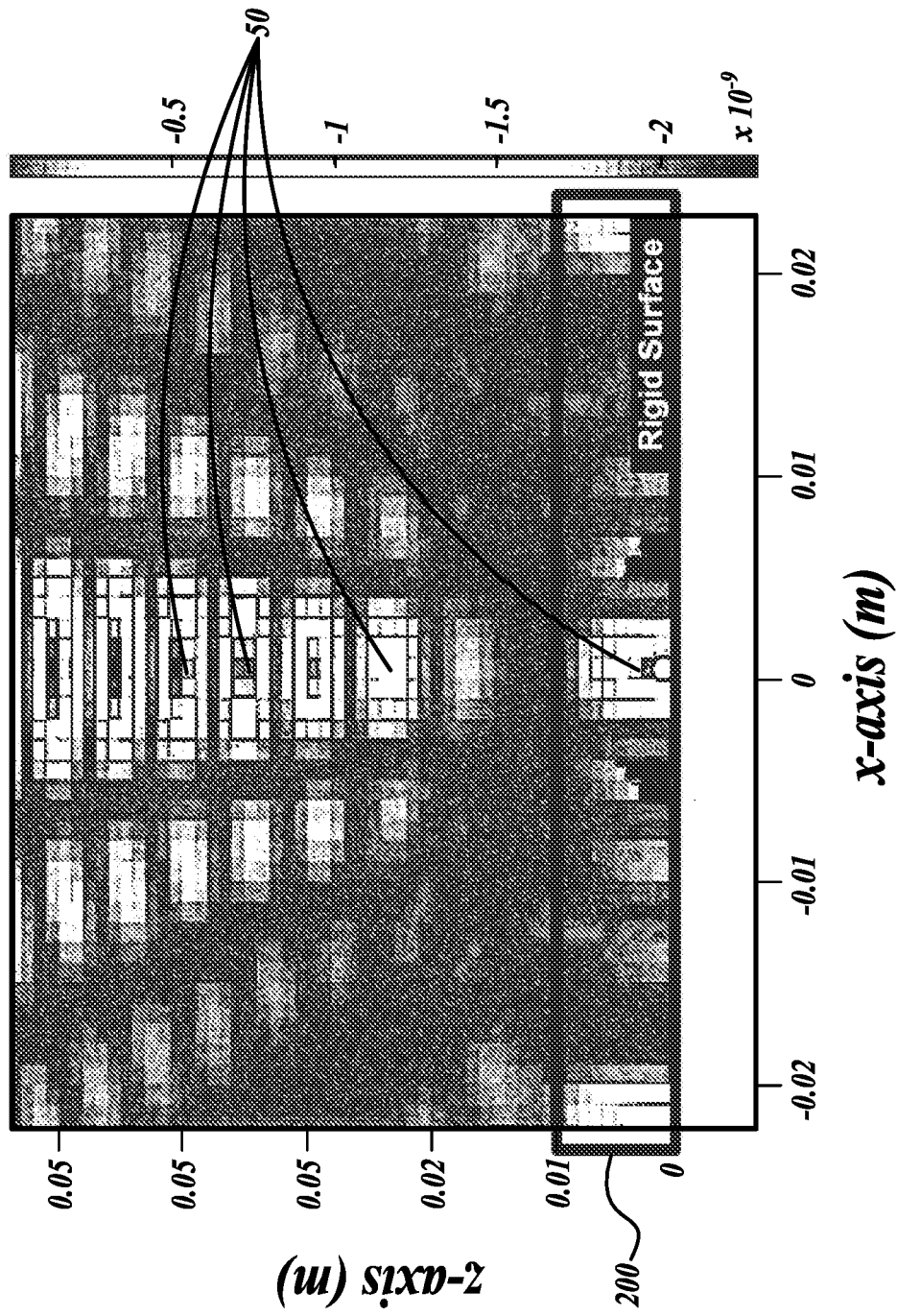
FIG. 2 is a graph of Gor'kov potential for a single transducer array in accordance with an embodiment of the present technology.

FIG. 2 is a graph of Gor'kov potential for a single transducer ring in accordance with an embodiment of the present technology. The horizontal axis and vertical axis respectively indicate location of the ultrasound field in X and Z directions. A single ultrasound array 200 that is parallel to the table 15 is active in this case. In some embodiments, Gor'kov potential may be understood as a combination of pressure and sound velocity.

Acoustic levitation devices may manipulate objects by modulating air particles using ultrasonic waves. The ultrasonic waves create a spatially distributed, time average acoustic energy pattern. Objects inside the acoustic field will move from positions of high acoustic potential energy, to areas of low acoustic potential energy. Based on the ultrasound transducers used and the voltage applied to these transducers, the acoustic pressure and air velocity distribution can be determined. Given the acoustic pressure distribution (p), and air velocity distribution (v), the acoustic potential energy or Gor'kov potential (U) can be found by applying the expression in Equation (2), $$U = 2\pi R^3 \left( \frac{\langle p^2 \rangle}{2\rho_0 c_0^2} - \frac{\rho_0 \langle v \cdot v \rangle}{2} \right) \quad (2)$$

where R is the radius of the levitated particle, po is the density of air and co is the speed of sound in air. The acoustic force is the gradient of the Gor'kov potential. From the Gor'kov acoustic potential scalar field, the acoustic force vector field (Fa) can be calculated using Eq. (3).

$$F_a = -\nabla U \quad (3)$$

The above equations may be solved by a MATLAB simulation that renders the acoustic field. FIG. 2 illustrates a potential distribution maps where Gor'kov potential distribution is not capable of lifting an object due to a stable node 50 located on the rigid surface (table top) 15. The location of the stable node 50 is the lowermost stable node 50 indicated in the graph. Thus, a particle initially resting on the table top experiences a downward acoustic force, pinning it to the table. This potential is due to a single ring of transducers above a rigid reflecting surface.

Figure 3:
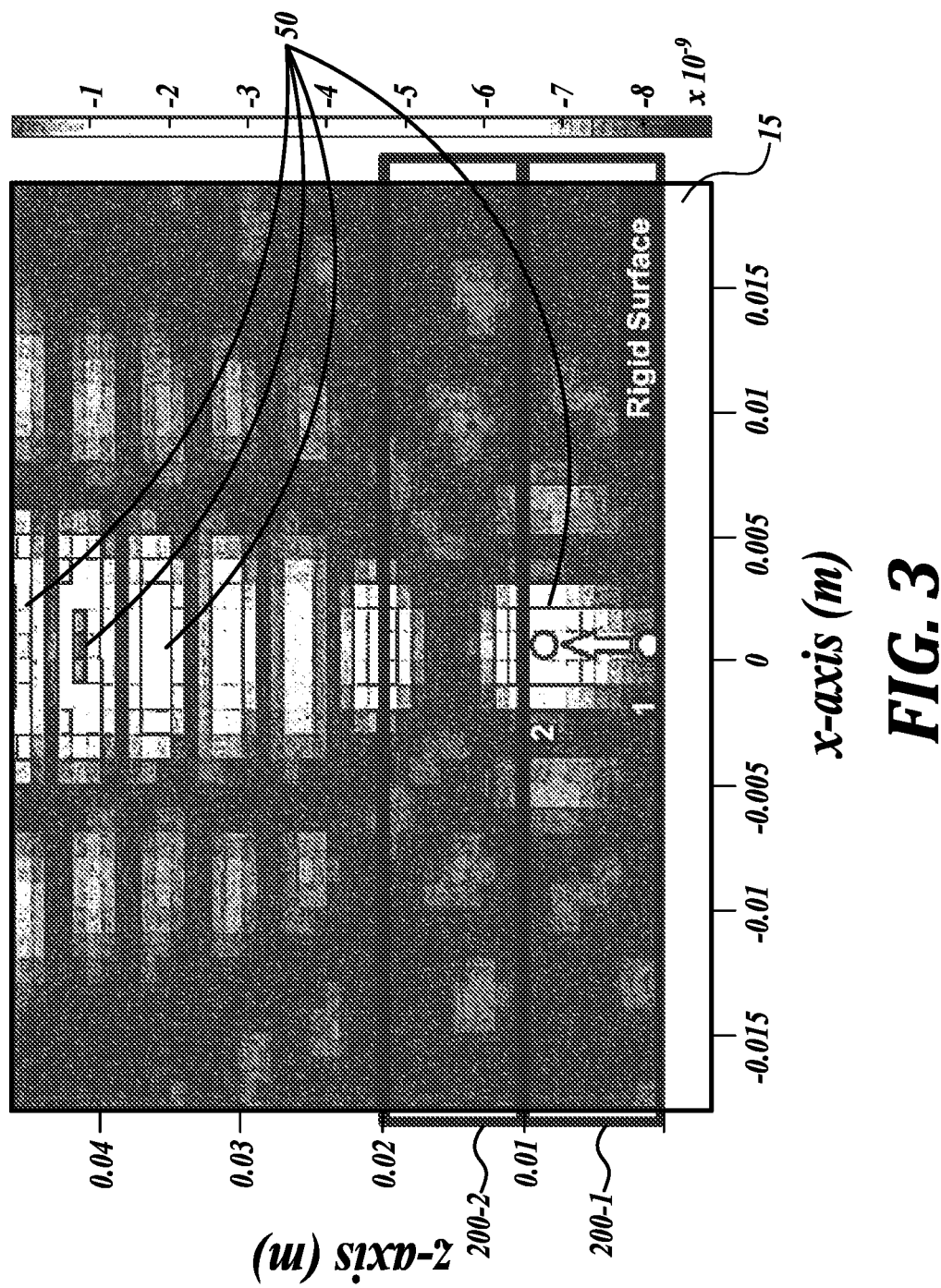
FIG. 3 is a graph of Gor'kov potential for dual transducer arrays in accordance with an embodiment of the present technology.

FIG. 3 is a graph of Gor'kov potential for dual transducer arrays in accordance with an embodiment of the present technology. A combination of two ultrasound arrays 200 that are parallel to the table 15 are modeled in this case. Here, a Gor'kov potential distribution is capable of lifting an object off a table top (as indicated by an arrow pointing from location 1 position to position 2). Under the influence of this potential, a particle that is initially resting on the table top at position 1 experiences a net upward force toward position 2, because at position 1 the upward force due to the acoustic field exceeds the downward force of gravity. As a result, the particle rises vertically until it reaches position 2, which is a stable local minimum at which gravity balances the upward acoustic force. This potential is due to two stacked ultrasound arrays 200-1 and 200-2 operating above a rigid reflecting surface 15.

Figures 4A, 4B:
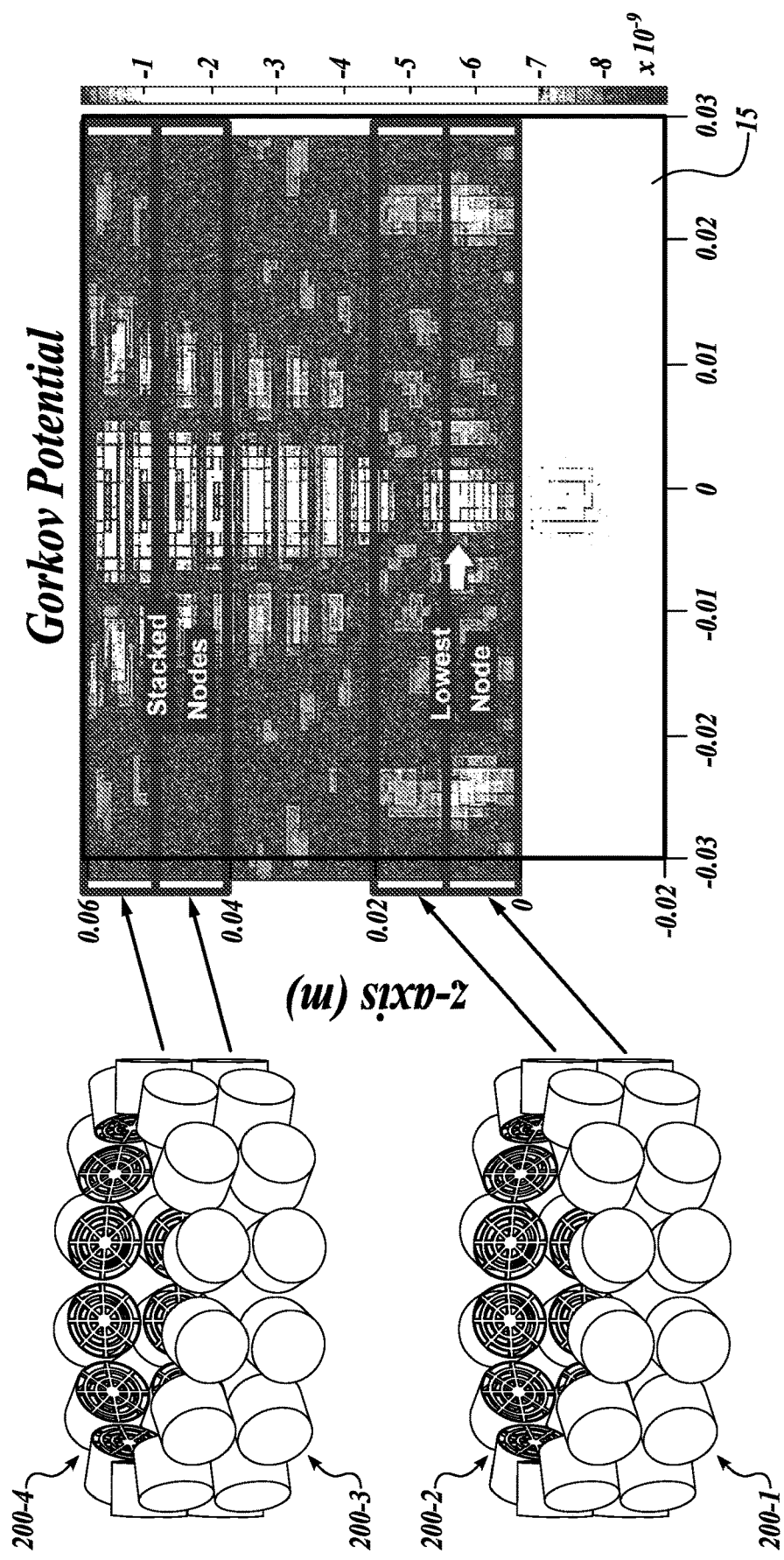
FIG. 4A is an isometric drawing of four transducer arrays in accordance with an embodiment of the present technology.
FIG. 4B is a graph of Gor'kov potential for four transducer arrays in accordance with an embodiment of the present technology.

FIG. 4A is an isometric drawing of four transducer ARRAYS 200 in accordance with an embodiment of the present technology. FIG. 4B is a corresponding graph of Gor'kov potential generated by these four transducer arrays.

FIG. 4A illustrates an embodiment of the ultrasound manipulator 200 with transducers arranged in cylindrical arrangements of ultrasound arrays at four elevational levels 200-1, 200-2, 200-3 and 200-4 from bottom to top. In the illustrated embodiment, the four level ring geometry of the ultrasound arrays 200-$i$ generates a stacked node structure with stable points located along the axis of the cylinder. These stable points may trap objects that can be then translated along the central axis of the cylinder (from one stable point to another). In some embodiments, multiple objects may be brought into contact at the stable points 50. For example, one object may be kept within the stable minimum, while bringing another object to it from another stable minimum. In other embodiments, two minima may be created next to each other, resulting in elongated field, followed by rotating the resulting elongated field.

In some embodiments, the ultrasound manipulator may include cylindrical arrays of 56 transducers 20 arranged into 4 ultrasound arrays 200-$i$. As explained above, multiple ultrasound arrays 200-$i$ may improve shifting of the Gor'kov potential. A cylindrical geometry also takes advantage of radial symmetry, with each transducer 20 positioned opposite another. In some embodiments, the trap generates multiple 40 kHz standing waves which intersect to form the illustrated stacked node structure along the central axis of the cylinder. This geometry may concentrate the acoustic energy along the central axis of the device, and may aid in the device's task of vertical object picking and lifting allowing an object to be translate from node to node.

Figure 5:
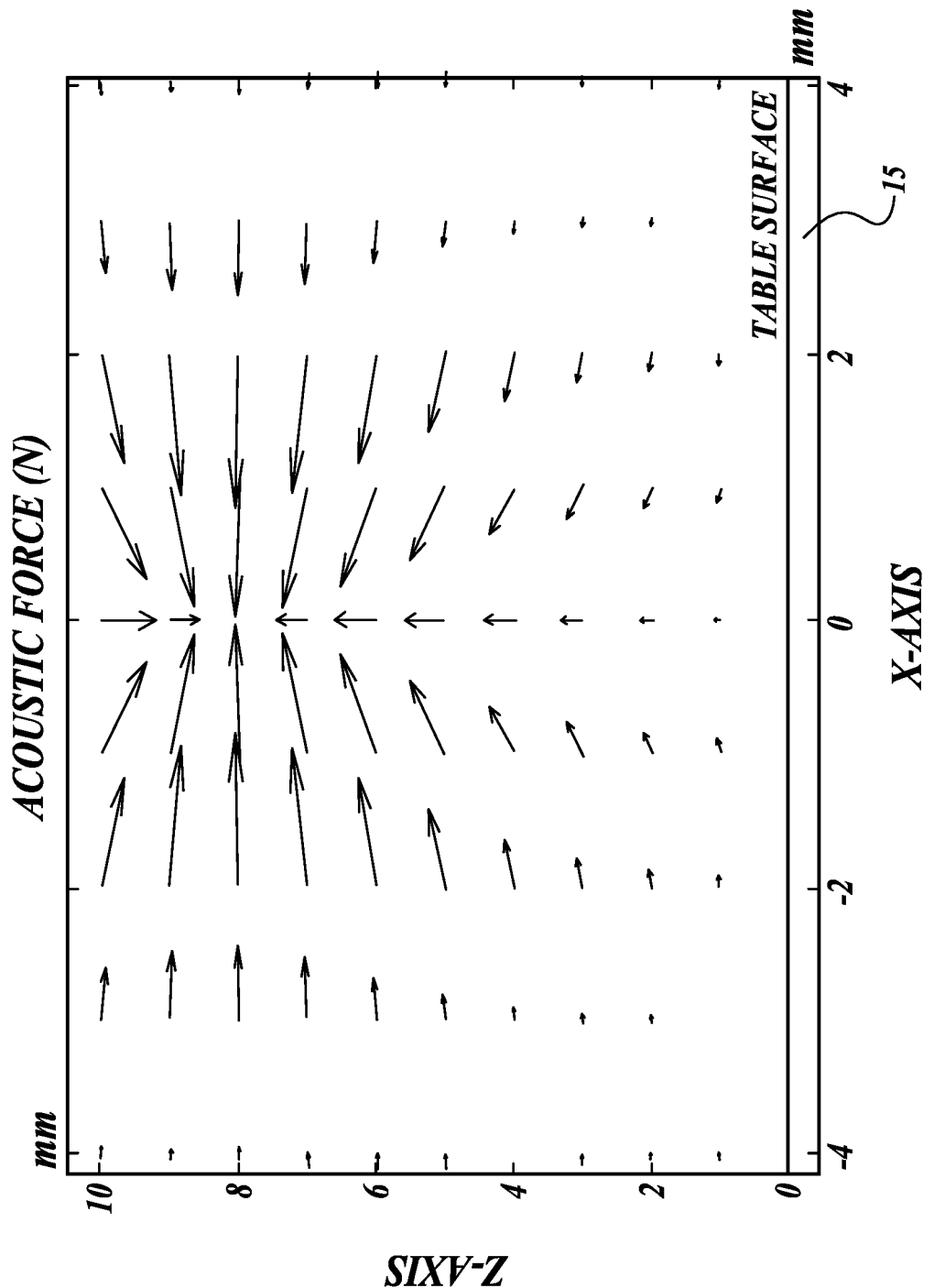
FIG. 5 is a graph of acoustic force in accordance with an embodiment of the present technology in accordance with an embodiment of the present technology.

FIG. 5 is a graph of acoustic force in accordance with an embodiment of the present technology in accordance with an embodiment of the present technology. The horizontal axis and vertical axis respectively indicate location of the ultrasound field in X and Z directions. The graph shows a quiver plot of the simulated acoustic force field exerted on an object during object picking. In the illustrated case, the object has a diameter of about 2 mm. In operation, the object is pulled upward to the stable convergence point located about 8 mm above the table surface. In different embodiments, different sizes of the object and locations of the convergent points are also possible.

FIGS. 6A-6F are partially schematic diagrams of activating and deactivating individual transducers in accordance with an embodiment of the present technology. Illustrated ultrasound levitator includes four ultrasound arrays 200-i, but in other embodiments different number of ultrasound arrays may be used. In different embodiments, select ultrasound transducers 20 of the ultrasound arrays 200-i may be activated and deactivated. In other embodiments, the entire ultrasound array is 200-i may be collectively activated and deactivated. In some embodiments, the ultrasound levitator may be a material agnostic manipulator capable of manipulating and/or suspending plants, small insects (e.g., mosquitoes), integrated circuits, food (e.g., potato chip crumb), etc.

FIGS. 6A-6F shows the picking action performed in 6 steps. In the figures, dash line represents activated transducers involved in the picking process and the solid line represents deactivated transducers (either individual transducers 20 or entire transducer arrays 200) for given step. For the illustrated embodiments, the direction of gravity is always in the plane of paper and down toward the caption of the figure. Different locations of the manipulated object 10 are indicated by a solid circle.

Figure 6B:
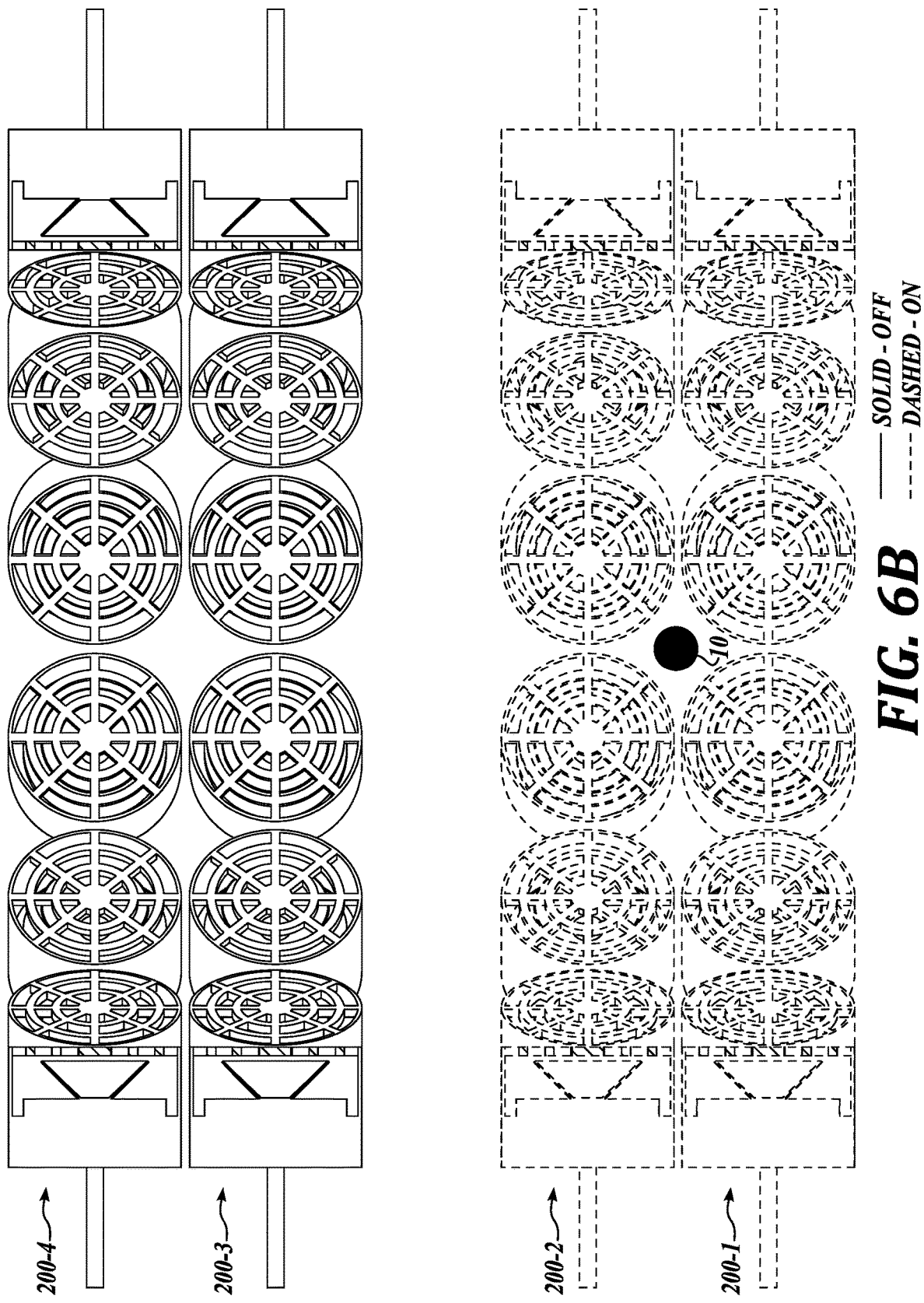
Figure 6C:
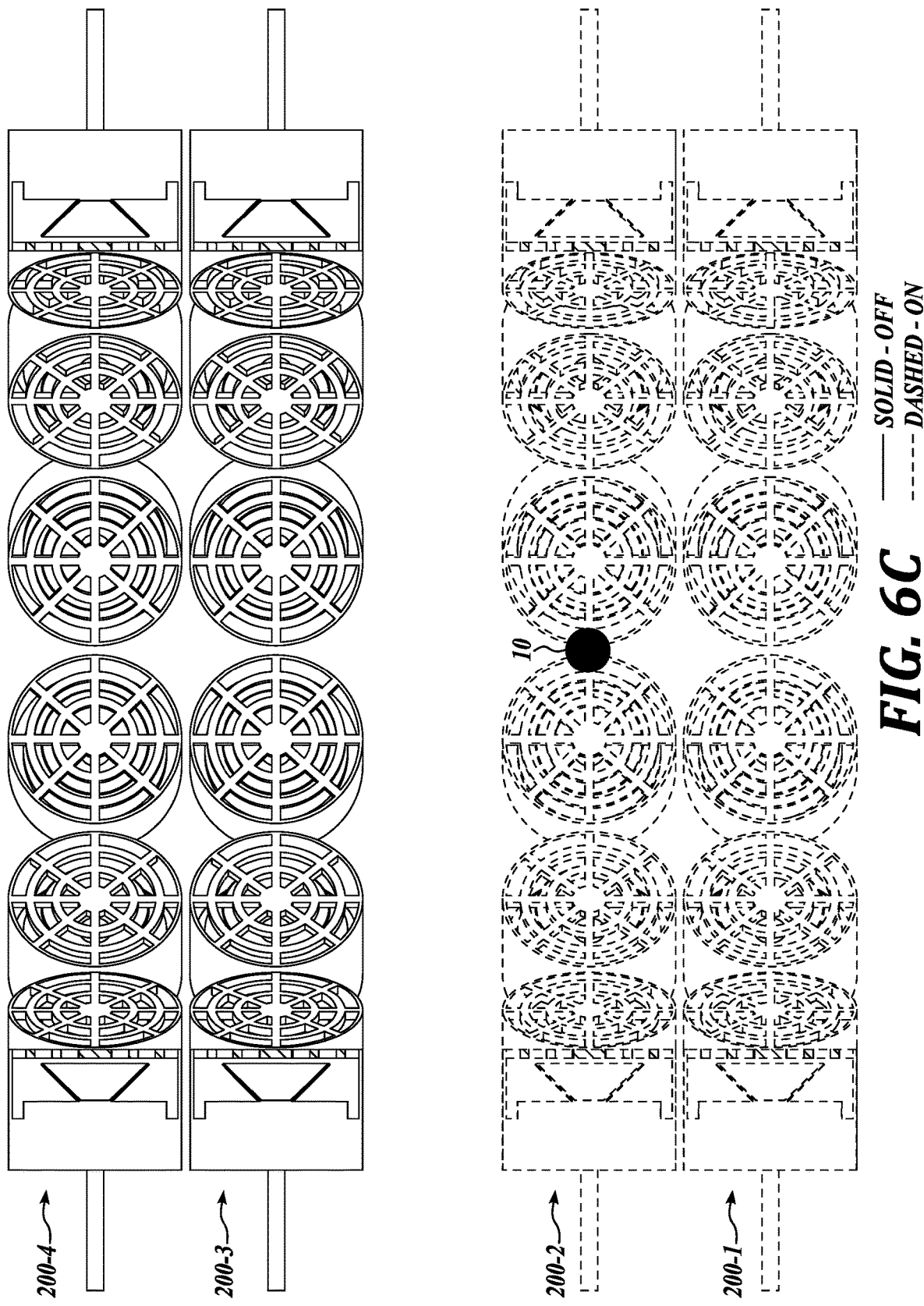

In FIG. 6A, the ultrasound manipulator is placed around the target object 10 and is brought to the center of the basin of attraction. Here, the target object 10 rests on the surface of the table. In FIG. 6B, the first two levels of the transducer rings (ultrasound array 200-1 and 200-2) are activated. An incremented phase shift is applied to the second level of transducer array, bringing the object to about 10 mm off the acoustically reflective surface of the table. In FIG. 6C, an incremental phase shift is applied to the bottom transducer array 200-1, moving the object from about 10 mm to about 15 mm elevation.

Figure 6D:
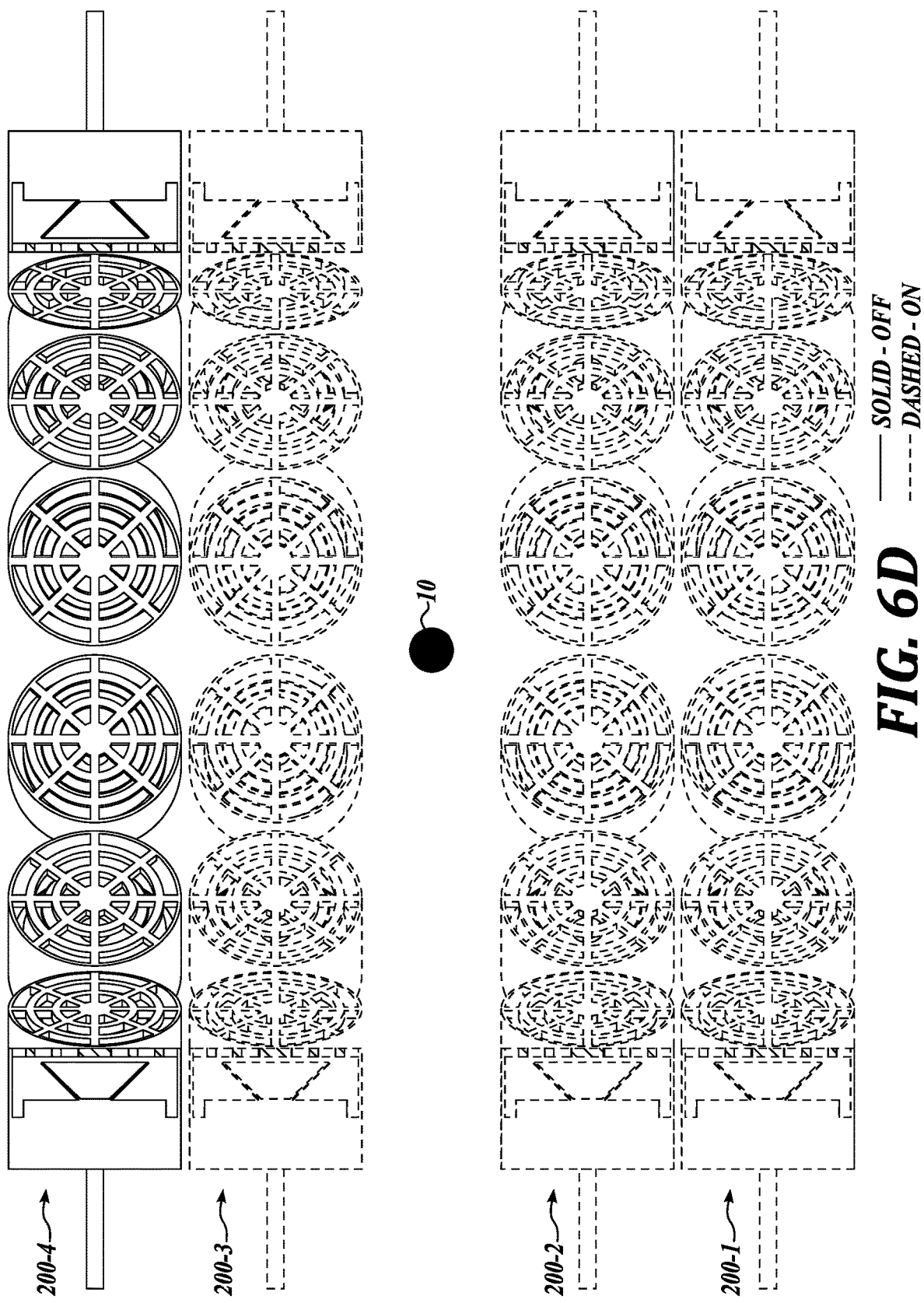

In FIG. 6D, a third ultrasound array 200-3 is activated, and the phase of the ultrasound array 200-2 and ultrasound array 200-3 are incremented. This moves the object from about 15 mm to about 30 mm in height. While only the bottom two rings of the manipulator are necessary for lifting an object off a reflective surface, the top two rings may be needed for lifting the object further off its initial resting surface and also for securing the object at a higher position. This may improve retention of the object 10, because lifting the manipulation device changes the reflected acoustic field and can dislodge the object 10 from the acoustic trap.

Figure 6E:
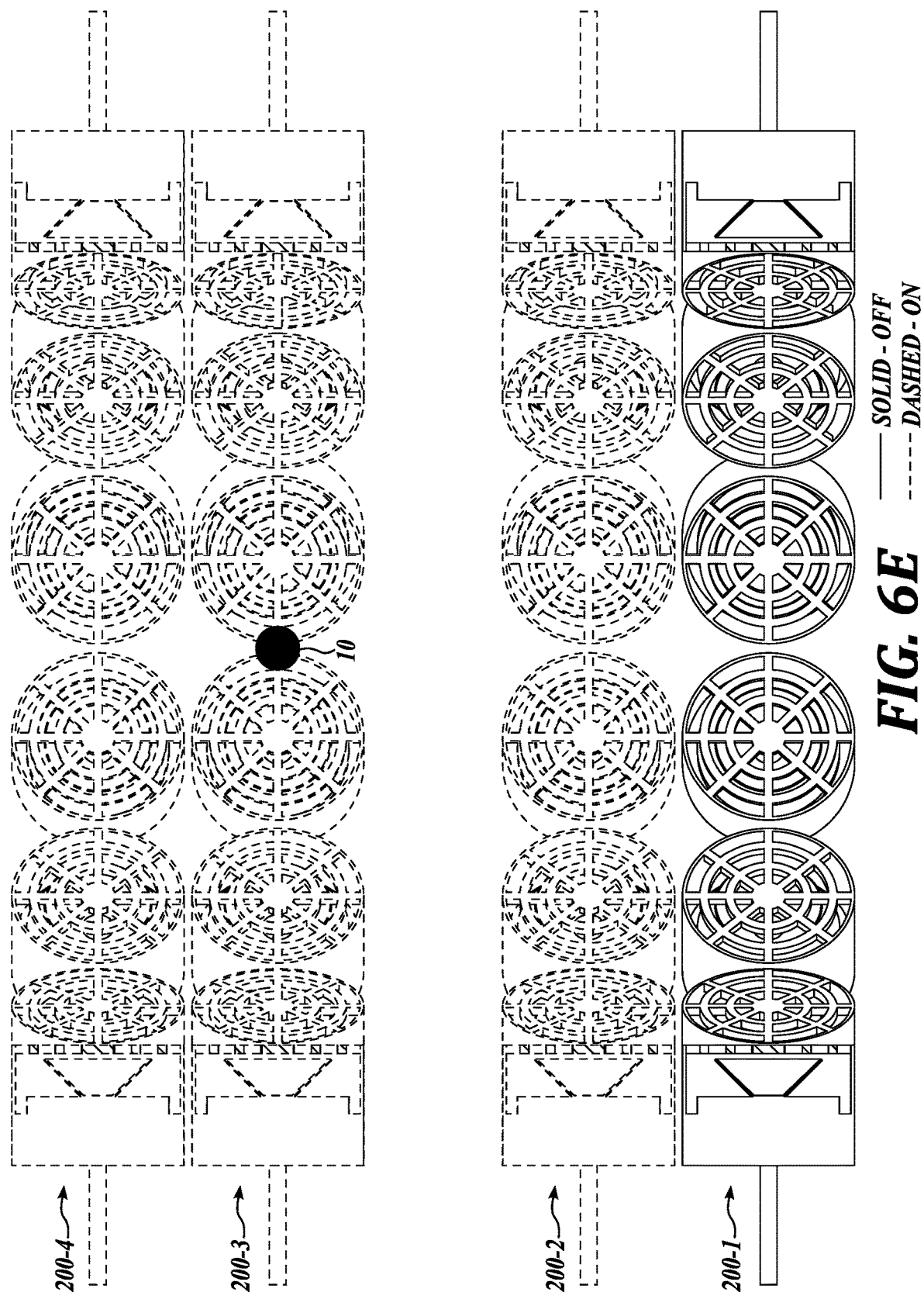
Figure 6F:
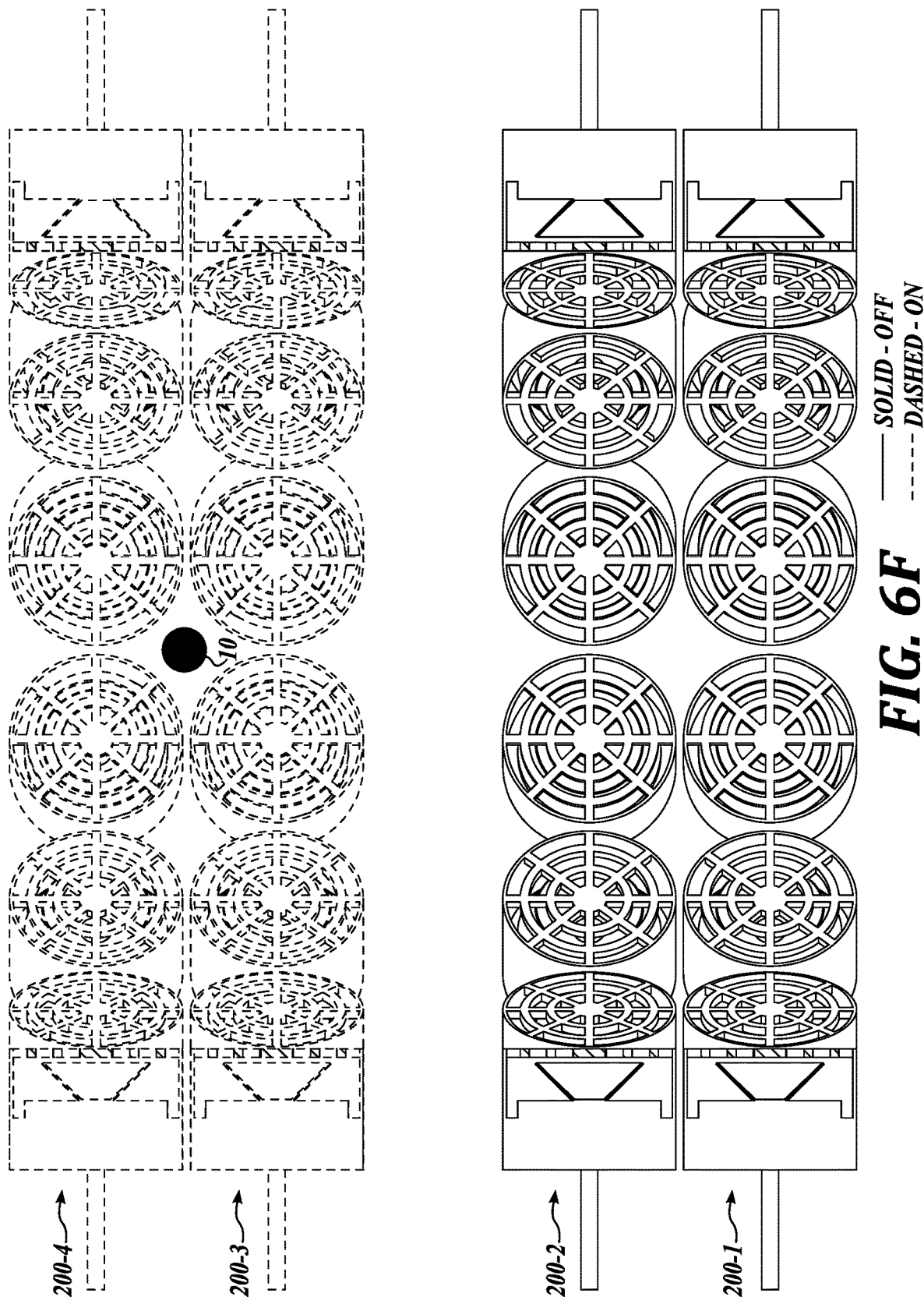

In FIG. 6E, the first transducer array 200-1 is deactivated, and the fourth transducer array 200-4 is activated. Furthermore, the phase of the third ultrasound array 200-3 and fourth ultrasound array 200-4 are incremented, moving the object from about 30 mm in height to about 45 mm in height. In FIG. 6F, the second ultrasound array 200-2 is deactivated, and the fourth ultrasound array 200-4 phase is adjusted. At this height, about 50 mm, the levitation device can be lifted from the surface of the table, by, for example, the mechanical manipulator 100 (not shown) repositioning the ultrasound arrays.

In some embodiments, a feedback loop capable of localizing the object in both height and lateral position within the trap may improve fine-tuned and coordinated object movement. Movement planning and ultrasonic transducer phase calculation may become easier to automate and more accurate with a localization method, therefore enabling fine-tuned rotation and translation of objects within the trap.

In some embodiments, the system also includes object geometry recognition and mapping to help optimize acoustic field strength based on target object size and shape. For example, acoustic lift force could be further maximized to accommodate objects larger than 2 mm.

Figure 7:
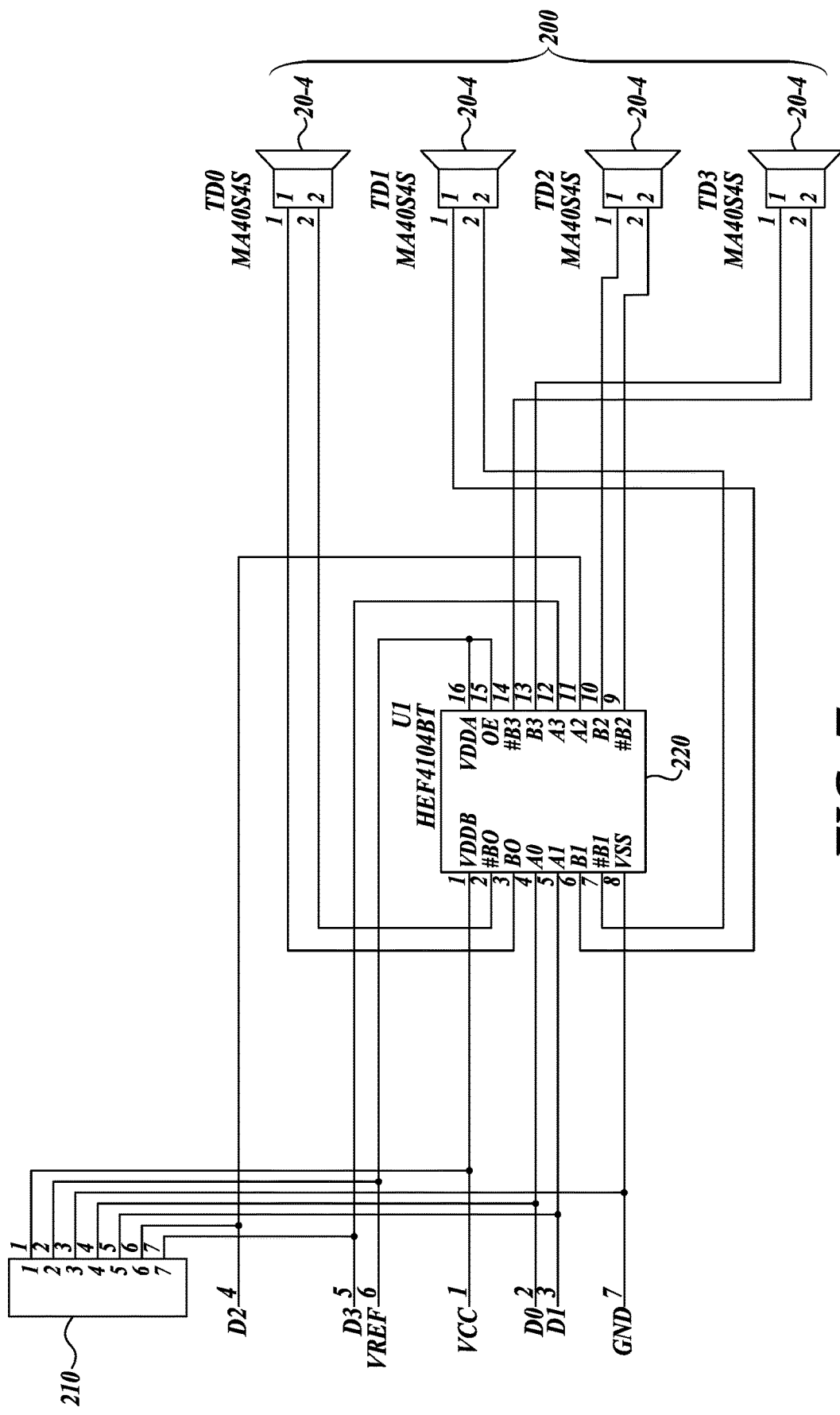
FIG. 7 is a schematic diagram of signal generation in accordance with an embodiment of the present technology.

FIG. 7 is a schematic diagram of signal generation in accordance with an embodiment of the present technology. In some embodiments, the electronic components of the schematic diagram may collectively represent the controller 230. In the illustrated embodiment, a processor 210 generates phase delay inputs based on, example, Equation 1. These phase delay inputs may be received by a programmable logic device 220. A nonlimiting example of such programmable logic device is a field programmable gate array (FPGA). The programmable logic device 220 produces phase delay signals that are provided to individual ultrasound transducers 20-i. In operation, the ultrasound transducers 20-i produce an ultrasound field with phase offsets such that, collectively, the ultrasound transducers generate node structure with stable points as, for example, illustrated in FIGS. 2-4B.

In some embodiments, each output channel has a phase resolution of 2500 steps or approximately 0.15°. The FPGA allows all output channels to be updated on the same clock edge for precise transducer clock timings. In some embodiments, the FPGA outputs are level translated from 3.3 V logic to 12 V logic and a 1800 phase is generated. The original and phase inverted signals may drive the 56 transducers differentially such that the transducers see a 24 Vpp signal.

Figure 8:
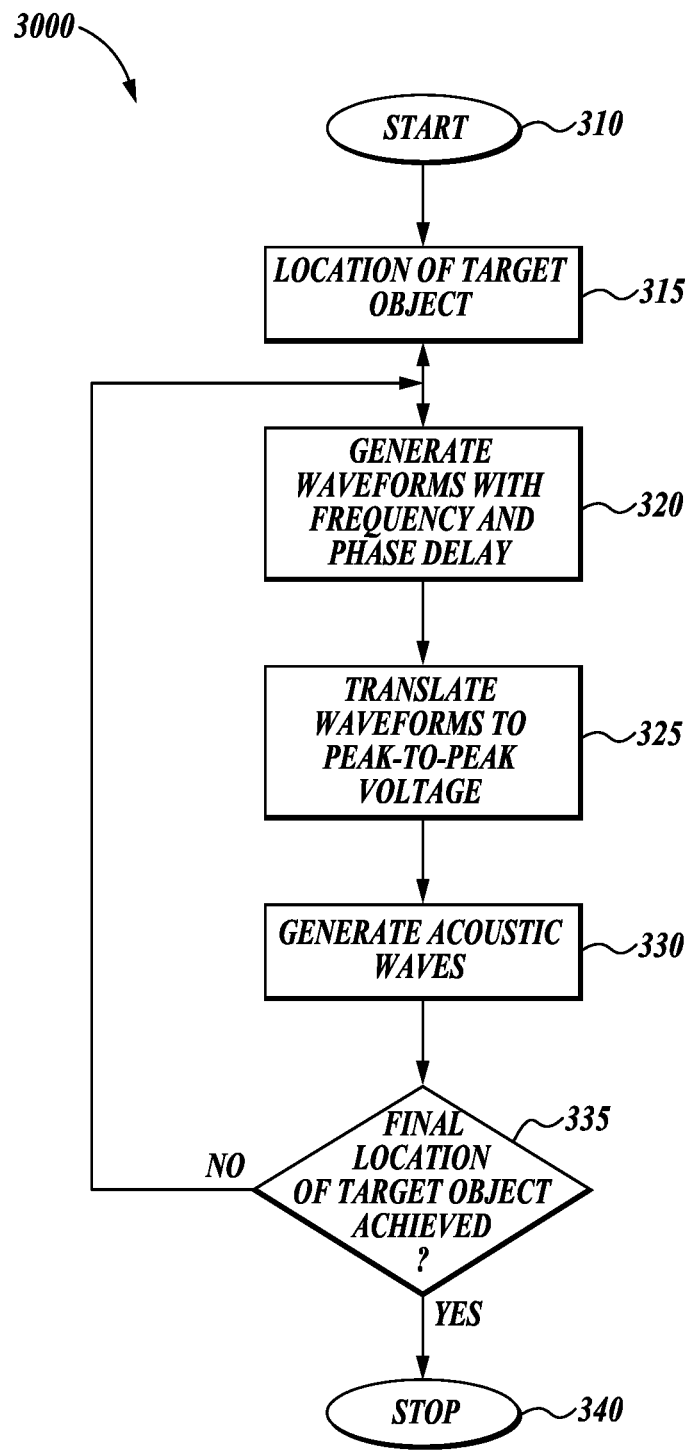
FIG. 8 is a flowchart of a method for non-contact manipulation of objects via ultrasonic levitation in accordance with an embodiment of the present technology.

FIG. 8 is a flowchart of a method for non-contact manipulation of objects via ultrasonic levitation in accordance with an embodiment of the present technology. In some embodiments, the method may include additional steps or may be practiced without all steps illustrated in the flow chart.

The method starts in block 310. In block 315, a location of the target object (e.g., object 10) may be provided. A nonlimiting example of such location may be solid surface of a table that carries the target object.

In block 320, the waveforms are generated with proper frequency and phase delays. Such waveforms may be generated using a combination of the processor 210 and programmable logic 220, as described above with reference to FIG. 7. In different embodiments, different electronic components may be used to generate the waveforms.

In block 325, these waveforms are converted into peak-to-peak voltages that are provided to the ultrasound transducers 20 of one or more corresponding ultrasound arrays 200. In block 330, the ultrasound transducers 20 generate acoustic waves which collectively produce node structure with stable pressure points that are used for capturing and manipulating the target object. In different embodiments, such manipulation of the target object may include manipulating a single object, bringing several objects into contact, rotating a group of objects, etc.

In block 335, a verification is performed as to whether the final location of the target object has been achieved. If the final location has not been achieved, the process goes back to block 320. If the final location has been achieved, the process may end in block 340.

Figure 9:
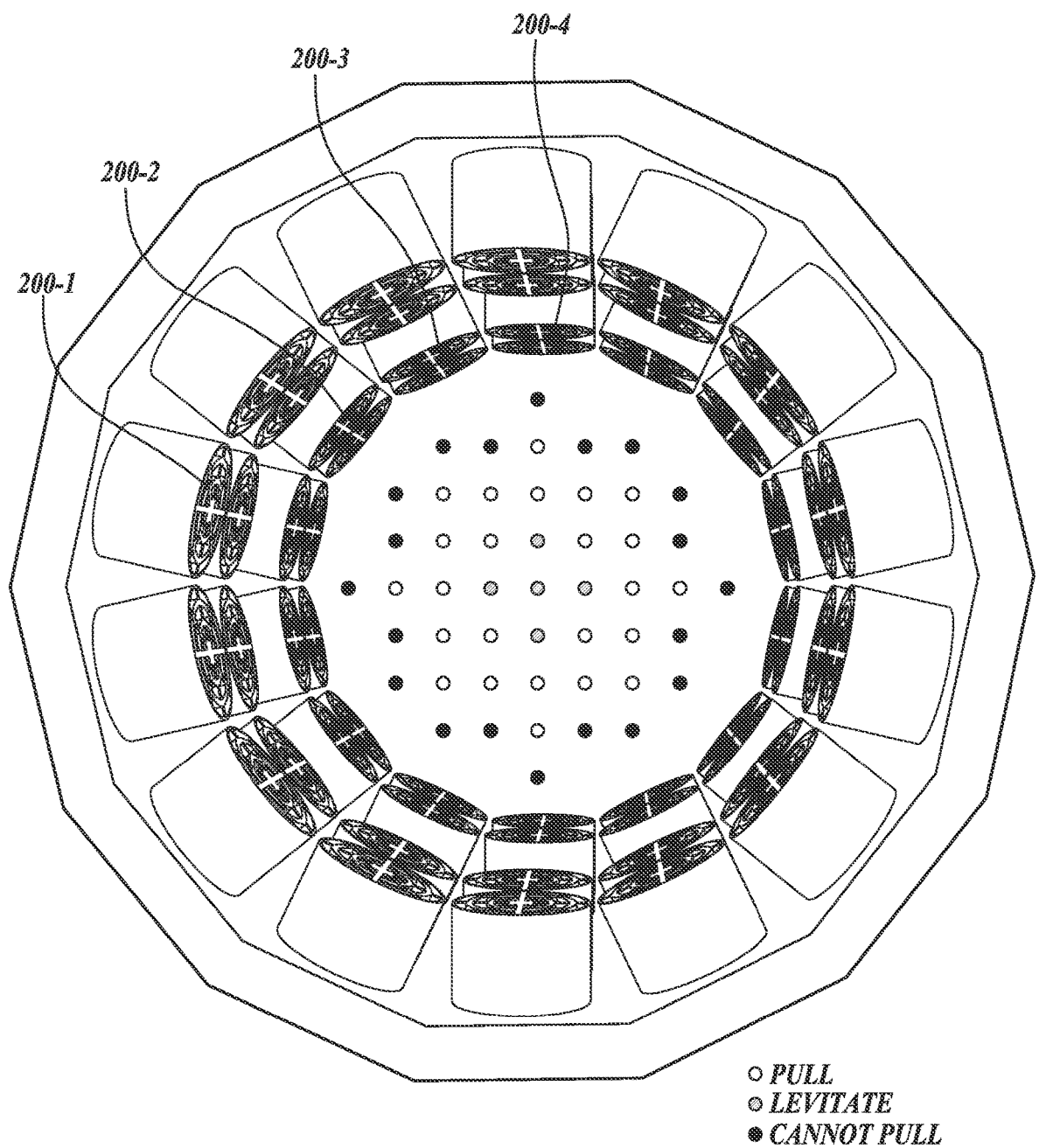
FIG. 9 is a graph of particle-manipulation capability in accordance with an embodiment of the present technology.

FIG. 9 is a graph of particle-manipulation capability in accordance with an embodiment of the present technology. In many embodiments, the mechanical manipulator 100 may not be capable of positioning the ultrasound levitator 200 such that the center of the cylindrical ultrasound array hovers directly above the object of interest, because the positioning error of the ultrasound levitator 200 may be larger than the size of the target object. Nevertheless, the ultrasound levitator 200 may compensate for the positioning error by increasing the "grasping" range of the robot. For contact-less manipulation via acoustic levitation, a basin of attraction refers to the area in which objects inside the cylinder can be either picked up or pulled by the acoustic field toward the inner area where the picking action via acoustic levitation is possible. In the illustrated example, the extent of the basin of attraction is shown by gray and white circles. The gray circles that correspond to the areas on the table from where the objects can be directly levitated. The white (open) dots represent the area where the manipulator can laterally move objects into the gray circles area, from where the objects can be picked, moved onto the gray dots area and levitated. The solid (black) circuits represent the area where the objects cannot be moved by the levitation force. Stated differently, the mechanical manipulator 100 needs to be reposition the acoustic manipulator such that its basin of attraction covers different areas in order to pull and start levitating the objects residing within the basin of attraction. In some embodiments, to compensate for about 10 mm positioning uncertainty, the basin of attraction is about 30 mm in diameter, resulting in an area of 706.86 mm2, therefore allowing for objects to be picked up despite positioning misalignment. Once an object has been lifted, say from a gray dot, the object can be moved upward and around laterally above the gray and w % bite dots as this basin of attraction only describes capabilities at the table surface. Objects can be moved around freely vertically and laterally around the upper regions of the levitator.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. For example, in some embodiments the counter or controller may be based on a low-power buck regulator connected to a capacitor. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," etc., mean plus or minus 5% of the stated value.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

What is claimed is:

1. A method for a non-contact manipulation of an object, the method comprising:
    lifting an object off a solid surface of a dispensing device by activating a first array of ultrasound transducers and a second array of ultrasound transducers, wherein the first array of ultrasound transducers and the second array of ultrasound transducers are vertically stacked, and wherein, when activated, the first array of ultrasound transducers and the second array of ultrasound transducers generate an ultrasound field;
    after lifting the object, positioning the object between the first array of ultrasound transducers and the second array of ultrasound transducers; and
    levitating the object by controlling the ultrasound field.

2. The method of claim 1, further comprising:
    generating phase delay inputs by a processor;
    receiving the phase delay inputs by a programmable logic device;
    producing phase delay signals by the programmable logic device;
    receiving the phase delay signals the ultrasound transducers; and
    levitating the object by operating individual ultrasound transducers based on the phase delay signals.

3. The method of claim 1, further comprising:
    activating a third array of ultrasound transducers, wherein the third array of ultrasound transducers is vertically stacked with the second array of ultrasound transducers; and
    after activating the third array of ultrasound transducers, repositioning the object between the second array of ultrasound transducers and the third array of ultrasound transducers.

4. The method of claim 1, further comprising:
    selectively deactivating ultrasound transducers of the first array of ultrasound transducers and the second array of ultrasound transducers.

5. The method of claim 1, further comprising:
    selectively deactivating the first array of ultrasound transducers or the second array of ultrasound transducers.

6. The method of claim 1, further comprising:
    generating the ultrasound field by activating a third array of ultrasound transducers; and
    generating the ultrasound field by activating a fourth array of ultrasound transducers,
    wherein the first, second, third and fourth arrays of ultrasound transducers are vertically stacked.

7. The method of claim 6, wherein the ultrasound transducers of the first, second, third and fourth arrays of ultrasound transducers are circularly arranged within their respective arrays.

8. The method of claim 6, wherein the ultrasound transducers of the first, second, third and fourth arrays of ultrasound transducers are rectangularly arranged within their respective arrays.

9. The method of claim 1, further comprising:
changing a position of at least one of the arrays of ultrasound transducers by a mechanical manipulator.

10. The method of claim 9, wherein the mechanical manipulator is a robotic arm attached to the array of ultrasound transducers.

11. The method of claim 1, wherein the object is a fluid particle, a particle of powder material, an insect, an integrated circuit chip, or a flower.

12. The method of claim 1, wherein the object is a first object, the method further comprising:
lifting a second object off the dispensing device by the ultrasound field by activating the first array of ultrasound transducers and the second array of ultrasound transducers;
levitating the second object by the ultrasound field; and
bringing the second object in contact with the first object.

13. A device for non-contact manipulation of an object, comprising:
a first array of ultrasound transducers configured for generating an ultrasound field;
a second array of ultrasound transducers configured for generating the ultrasound field, wherein the first array of ultrasound transducers and the second array of ultrasound transducers are vertically stacked; and
a controller configured to generate phase delay signals for the first and second arrays of ultrasound transducers;
wherein the ultrasound field is configured for:
lifting the object off a solid surface of a dispensing device by activating the first array of ultrasound transducers and the second array of ultrasound transducers,
after lifting the object, positioning the object between the first array of ultrasound transducers and the second array of ultrasound transducers, and
levitating the object by the ultrasound field.

14. The device of claim 13, wherein the controller comprises:
a processor configured for generating phase delay inputs; and
a programmable logic device configured for:
receiving the phase delay inputs from the processor, and
producing the phase delay signals.

15. The device of claim 13, further comprising:
a mechanical manipulator that is attached to at least one of the first array of ultrasound transducers or the second array of ultrasound transducers, wherein the mechanical manipulator is configured for changing a position of the at least one of the first array of ultrasound transducers or the second array of ultrasound transducers.

16. The device of claim 15, wherein the mechanical manipulator is a robotic arm.

17. The device of claim 13, wherein the object is a fluid particle, a particle of powder material, an insect, an integrated circuit chip, or a flower.

18. The device of claim 13, further comprising:
a third array of ultrasound transducers configured for:
generating the ultrasound field by activating the third array of ultrasound transducers, wherein the second array of ultrasound transducers and the third array of ultrasound transducers are vertically stacked; and
after activating the third array of ultrasound transducers, repositioning the object between the second array of ultrasound transducers and the third array of ultrasound transducers.

19. The device of claim 18, further comprising:
a fourth array of ultrasound transducers configured for generating the ultrasound field by activating the fourth array of ultrasound transducers, wherein the first, second, third and fourth arrays of ultrasound transducers are vertically stacked.

20. The device of claim 19, wherein individual ultrasound transducers of the first, second, third and fourth arrays of ultrasound transducers are configured for:
individual activation and deactivation, or
array-by-array activation and deactivation.

21. The device of claim 13, wherein the ultrasound transducers are circularly or rectangularly arranged within their respective arrays.

* * * * *